(12) United States Patent
Hessling-Von Heimendahl et al.

(10) Patent No.: US 11,479,366 B2
(45) Date of Patent: Oct. 25, 2022

(54) EXTERIOR AIRCRAFT LIGHT, AIRCRAFT COMPRISING THE SAME, AND METHOD OF OPERATING AN EXTERIOR AIRCRAFT LIGHT

(71) Applicant: Goodrich Lighting Systems GmbH, Lippstadt (DE)

(72) Inventors: Andre Hessling-Von Heimendahl, Koblenz (DE); Marion Depta, Lippstadt (DE); Anil Kumar Jha, Lippstadt (DE); Andreas Ueberschaer, Gütersloh (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 622 days.

(21) Appl. No.: 16/361,376

(22) Filed: Mar. 22, 2019

(65) Prior Publication Data
US 2019/0291894 A1  Sep. 26, 2019

(30) Foreign Application Priority Data
Mar. 23, 2018  (EP) .................................... 18163709

(51) Int. Cl.
*B64D 47/06* (2006.01)
*B64C 5/02* (2006.01)

(52) U.S. Cl.
CPC ................ *B64D 47/06* (2013.01); *B64C 5/02* (2013.01); *B64D 2203/00* (2013.01)

(58) Field of Classification Search
CPC .... B64D 2203/00; B64D 47/06; B64D 47/02; B64D 47/04; B64C 5/02
See application file for complete search history.

(56) References Cited

U.S. PATENT DOCUMENTS

| 2,704,321 A | 3/1955 | Orlansky | |
|---|---|---|---|
| 2012/0327378 A1* | 12/2012 | Harvey | G09G 3/025 353/52 |
| 2015/0274319 A1* | 10/2015 | Jha | B64D 47/06 362/470 |
| 2016/0046389 A1 | 2/2016 | Jha et al. | |
| 2016/0368621 A1* | 12/2016 | Lueder | B64C 5/02 |
| 2017/0181246 A1* | 6/2017 | Hessling-Von Heimendahl | B64D 47/02 |

(Continued)

FOREIGN PATENT DOCUMENTS

| GB | 2553524 | A | 3/2018 | |
| GB | 2553524 | * | 3/2022 | ............. B64D 47/02 |

OTHER PUBLICATIONS

Extended European Search Report for International Application No. 18163709.1 dated Sep. 21, 2018, 8 pages.

*Primary Examiner* — Assres H Woldemaryam
(74) *Attorney, Agent, or Firm* — Cantor Colburn LLP

(57) ABSTRACT

An exterior aircraft light includes a housing having a length (L), a width (W), and a height (H), the length (L) being greater than the width (W) and the height (H) and the housing having a front end region and a rear end region, wherein the housing is configured to be mounted on a tail portion of a fuselage of an aircraft; at least one first light source, arranged in the rear end region of the housing, for providing aircraft rearward signal lighting; and a plurality of second light sources, which are arranged spaced along the length (L) of the housing for a distributed illumination of a stabilizer of the aircraft.

14 Claims, 12 Drawing Sheets

(56) References Cited

U.S. PATENT DOCUMENTS

| | | |
|---|---|---|
| 2017/0233100 A1 | 8/2017 | Gagnon et al. |
| 2017/0233101 A1* | 8/2017 | Hessling-Von Heimendahl ......... F21V 5/04 362/470 |
| 2018/0050821 A1* | 2/2018 | Schoen .................. B64D 47/06 |
| 2018/0084620 A1* | 3/2018 | Klein ..................... H05B 45/58 |

* cited by examiner

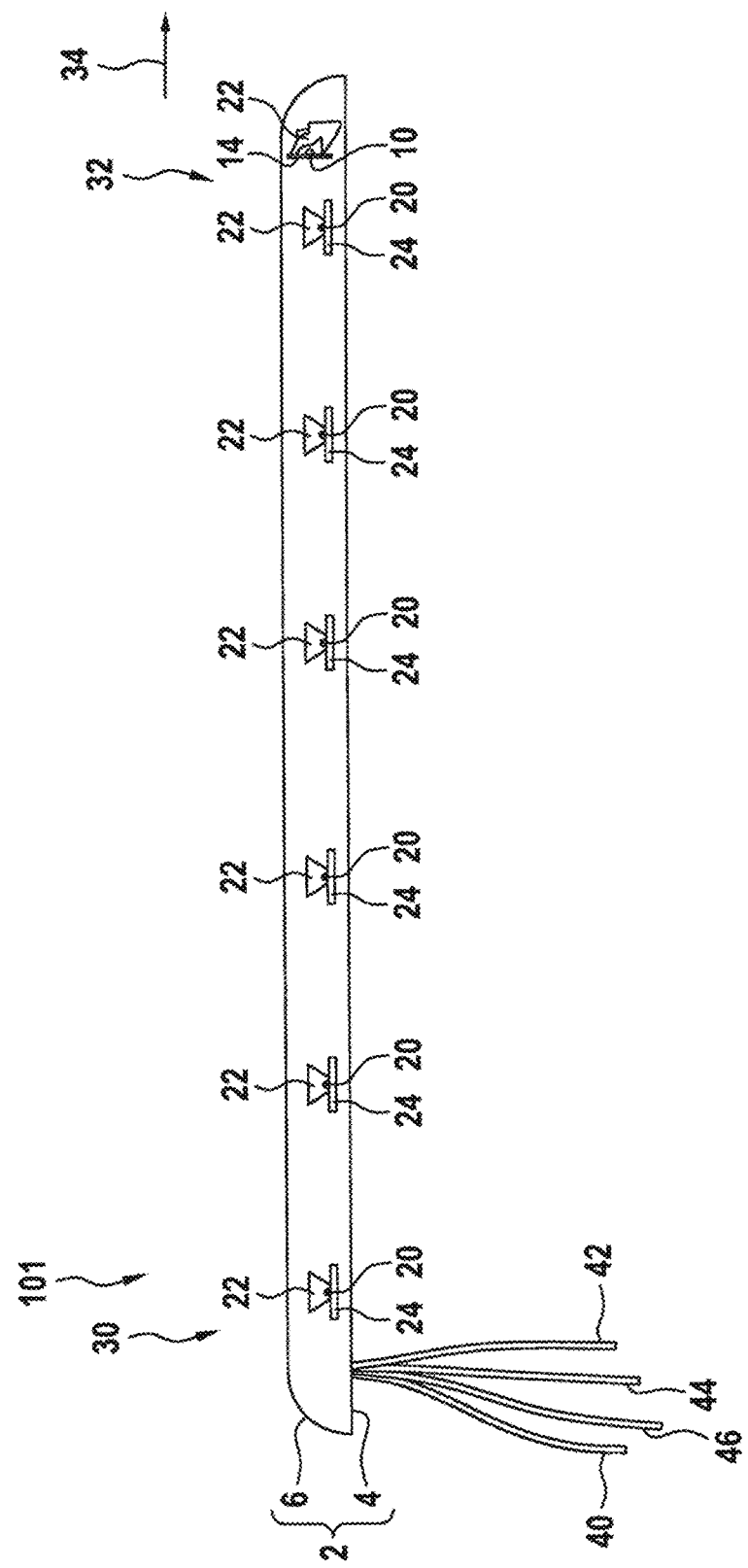

EXTERIOR AIRCRAFT LIGHT, AIRCRAFT COMPRISING THE SAME, AND METHOD OF OPERATING AN EXTERIOR AIRCRAFT LIGHT

FOREIGN PRIORITY

This application claims priority to European Patent Application No. 18163709.1 filed Mar. 23, 2018, the entire contents of which is incorporated herein by reference.

TECHNICAL FIELD

The present invention is in the field of exterior aircraft lighting. In particular, the present invention relates to the part of the exterior lighting system of aircraft that is arranged around the tail of the aircraft. Further in particular, the present invention relates to the exterior aircraft lights that are provided in the tail portion of large commercial aircraft, such as passenger and cargo airplanes.

BACKGROUND

Large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another exemplary group of exterior aircraft lights are scan lights that allow the inspection of the aircraft structure in the dark, such as wing scan lights. Somewhat related to this group of scan lights are lights for illuminating the vertical stabilizer of aircraft, generally arranged in the tail portion of an aircraft. Such illumination allows for a scan of the vertical stabilizer in the dark, such as during an operational check of the rudder on an air field. The lights for illumination of the vertical stabilizer also help in identifying aircraft during the approach or during taxiing on the air field, because the vertical stabilizer commonly contains an airline logo. For this reason, such lights are often also referred to as logo lights.

Exterior aircraft lights add weight to the aircraft, pose restrictions on the aircraft design, and require a significant amount of maintenance, leading to extended downtimes of the aircraft. Presently used exterior aircraft lighting systems are not fully satisfactory.

Accordingly, it would be beneficial to provide an exterior aircraft light that contributes to the provision of improved exterior aircraft lighting systems. Further, it would be beneficial to provide an aircraft equipped with such exterior aircraft lights.

SUMMARY

Exemplary embodiments of the invention include an exterior aircraft light, comprising a housing having a length, a width, and a height, the length being greater than the width and the height and the housing having a front end region and a rear end region, wherein the housing is configured to be mounted on a tail portion of a fuselage of an aircraft; at least one first light source, arranged in the rear end region of the housing, for providing aircraft rearward signal lighting; and a plurality of second light sources, which are arranged spaced along the length of the housing for a distributed illumination of a stabilizer of the aircraft.

Exemplary embodiments of the invention allow for the integration of rearward signal lighting functionality and stabilizer illuminating functionality into an integrated light unit. With the exterior aircraft light having a housing that can be mounted to the tail portion of the fuselage of the aircraft and with the plurality of second light sources being spaced along the length of the housing, efficient illumination of a stabilizer of the aircraft can be ensured, while at the same time providing a suitable position for rearward signal lighting. As compared to previous approaches, where stabilizer illumination was carried out by a dedicated light unit in the horizontal stabilizer of an aircraft and were rearward signal lighting was carried out by a dedicated light unit next to the outlet of the auxiliary power unit at the very tail of the aircraft, two previously separate functionalities may be integrated into the described exterior aircraft light. Space and weight may be saved in inconvenient locations, such as the vertical stabilizer of the aircraft. Also, the area around the output of the auxiliary power unit may be kept free of light units, reducing the problem of maintenance due to aggressive outlet gases of the auxiliary power unit.

The exterior aircraft light in accordance with exemplary embodiments of the invention may also be viewed as a new kind of stabilizer illumination light that has the additional benefit of including rearward signal lighting functionality. The exterior aircraft light in accordance with exemplary embodiments of the invention may also be considered a combined stabilizer illumination and rearward signalling light. By combining multiple lighting functionalities into such new kind of exterior aircraft light, new degrees of freedom regarding the overall exterior aircraft lighting system may be provided, and parameters thereof, such as overall weight, power consumption, and/or power line lengths, may be improved.

The plurality of second light sources are arranged spaced along the length of the housing for a distributed illumination of a stabilizer of the aircraft. It is possible that the illuminated stabilizer is the vertical stabilizer of the aircraft. In other words, the plurality of second light sources may be arranged spaced along the length of the housing for a distributed illumination of the vertical stabilizer of the aircraft. In this way above described checks of the vertical stabilizer and illumination thereof for identification of the aircraft can be carried out with the described exterior aircraft light. It is also possible that the illuminated stabilizer is a horizontal stabilizer of the aircraft. In other words, the plurality of second light sources may be arranged spaced along the length of the housing for a distributed illumination of a horizontal stabilizer of the aircraft, in particular for a distributed illumination of the underside of a horizontal stabilizer of the aircraft. In this way, the underside of the horizontal stabilizer(s) of the aircraft may be used as an additional tool for identification of an aircraft from the ground. For example, in case the underside of the horizontal stabilizer(s) is also provided with an airline logo or characteristic airline color, the illumination thereof allows for a visual identification of the aircraft from the ground, e.g. in the vicinity of an airport or during an airport overpass by the aircraft.

The housing is configured to be mounted on a tail portion of a fuselage of an aircraft. In particular, the housing may be configured to be mounted adjacent to a stabilizer in the tail portion of the fuselage of the aircraft, in particular adjacent to the stabilizer to be illuminated by the plurality of second light sources. Further in particular, the housing may be configured to be mounted substantially along the stabilizer, in particular somewhat spaced therefrom. In this way, the housing may be configured to be mounted to the tail portion of the fuselage of the aircraft generally along the longitudinal direction of the fuselage. Depending on the shape of the fuselage in the tail portion, the housing may be skewed with respect to the longitudinal direction of the fuselage, e.g. when the tail portion of the fuselage converges towards the back of the aircraft. When talking about the mounting orientation of the exterior aircraft light, the description herein is generally given with respect to the longitudinal direction of the housing, i.e. with respect to the extension direction of the housing along its length.

The at least one first light source may be at least one first LED. Also, the at least one first light source may be at least one white first light source. In particular, the at least one first light source may be at least one first white LED. By emitting white light, the rearward signal lighting may immediately comply with the requirement of rearward navigation lighting having white light.

The plurality of second light sources may be plurality of second LEDs. Also, the plurality of second light sources may be white light sources. It also possible that the plurality of second light sources are colored light sources, in particular having a color that is reflected well by the color of the stabilizer of a particular aircraft in question. In particular, the plurality of second light sources may be a plurality of white and/or colored LEDs. The plurality of second light sources may also be of different colors in order to achieve a desired spectrum for the illumination of the stabilizer. For example, the color of the light output of the plurality of second LEDs may be tunable with the help of warm white or red LEDs. It is also possible that the plurality of second light sources, in particular the plurality of second LEDs, have a light output that simulates sunlight color. In this way, a very similar or even identical color appearance of the stabilizer during night and day may be achieved. Also, the color(s) of the plurality of second light sources, in particular of the plurality of second LEDs, may be optimized with respect to the logo/color to be illuminated, contributing to the good identification thereof.

The plurality of second light sources are arranged spaced along the length of the housing. In particular, the plurality of second light sources are distributed in the housing between the front end region and the rear end region thereof. In this way, the stabilizer may be illuminated from a plurality of positions, which in turn may lead to a particularly efficient and homogeneous illumination thereof.

With the plurality of second light sources being arranged spaced along the length of the housing and in operation illuminating the stabilizer of the aircraft and with the at least one first light source being arranged in the rear end region of the housing and providing aircraft rearward signal lighting, the at least one first light source and the plurality of second light sources have diverging orientations within the housing. In particular, the at least one first light source may be arranged on a first mounting plate and the plurality of second light sources may be arranged on one or more second mounting plate(s), with the first mounting plate being substantially orthogonal to the second mounting plate. In other words, the orientation of the at least one first light source, e.g. defined by the main LED light emission direction, may be orthogonal to the orientations of the plurality of second light sources, e.g. defined by the main LED light emission directions.

The at least one first light source is arranged in the rear end region of the housing for providing aircraft rearward signal lighting. In particular, the at least one first light source may be directed towards a rear face of the exterior aircraft light. In particular, the light output of the at least one first light source may leave the exterior aircraft light via a rear face thereof.

The term aircraft rearward signal lighting refers to light output that is part of the rearward signalling capacities of the aircraft, such as part of the navigation lighting and/or anti-collision lighting capacities. In particular, the light output of the described exterior aircraft light may form a part of the overall rearward navigation light functionality and/or part of the overall anti-collision light functionality of the aircraft. In particular, the exterior aircraft light may provide a part of the white rear navigation light functionality, as required for aircraft. In addition/in the alternative, the exterior aircraft light may provide a rearward part of the white strobe anti-collision light functionality and/or the red beacon light functionality, generally required for the entire 360° environment of the aircraft. In yet other words, the exterior aircraft light may provide a rearward part of the signal lighting required for commercial aircraft.

According to a further embodiment, the at least one first light source is arranged in the rear end region of the housing for providing at least one of aircraft rearward navigation lighting, aircraft rearward white strobe anti-collision lighting, and aircraft rearward red beacon lighting. In particular, the at least one first light source may be arranged in the rear end region of the housing for providing at least one of aircraft rearward navigation lighting and aircraft rearward white strobe anti-collision lighting. Further in particular, the at least one first light source may be arranged in the rear end region of the housing for providing aircraft rearward navigation lighting and aircraft rearward white strobe anti-collision lighting. In this way, the exterior aircraft light may provide one or two or three signal lighting functionalities in a particular angular output region in the frame of reference of the aircraft. When positioned behind an aircraft, an observer is used to see a white continuous light output, a white flashing light output and/or a red flashing light output, depending on the momentary operation of the aircraft. Accordingly, the present exterior aircraft light may, in addition to illuminating a stabilizer of the aircraft, provide one, two, or three of the signal lighting functionalities expected in a rearward direction, when seen from behind the aircraft. As both the rearward navigation lighting and the white strobe anti-collision lighting rely on the emission of white light, these two functionalities may be integrated into the exterior aircraft light in a particularly beneficial manner, as will also be laid out in greater detail below.

According to a further embodiment, the at least one first light source is exactly one first light source. In other words, the at least one first light source consists of exactly one light source. This exactly one first light source may be exactly one first LED. Having one first light source arranged in the rear end region of the housing and providing aircraft rearward signal lighting allows for a particularly well-defined origin of the light and may thus allow for a particularly exact and efficient conditioning of the aircraft rearward signal lighting. Also, aircraft rearward navigation lighting and aircraft rearward white strobe anti-collision lighting may be achieved via a single first light source, as will also be explained in greater detail below.

According to a further embodiment, the exterior aircraft light further comprises at least one first optical system, associated with the at least one first light source, with the at least one first optical system transforming the light output from the at least one first light source into a signalling output light intensity distribution for aircraft rearward signal lighting. In case the at least one first light source is exactly one first light source, the at least one first optical system may also be exactly one first optical system. The exactly one first light source and the exactly one optical system may form an integrated light generation and conditioning unit, which may provide for the desired signal lighting without any further optical elements. However, it is also possible that a lens cover, which closes the housing, as laid out below, forms a final light conditioning stage. Further, it is also possible that multiple first light sources and multiple first optical systems, respectively associated with each of the multiple first light sources, are provided. In particular, it is possible that dedicated first light sources and first optical systems are provided for above described one, two or three signalling functions.

According to a further embodiment, the at least one optical system comprises at least one lens. In particular, each of the at least one optical system may comprise exactly one lens. Further in particular, if the at least one first optical system is exactly one first optical system, said one first optical system may comprise exactly one lens. Further in particular, said first optical system may consists essentially of one lens. The lens may have multiple lens portions in particular, the lens may have a collimating total internal reflection surface and/or one or more collimating refraction surfaces and/or one or more re-distributing refraction surfaces. The at least one lens may be shaped to transform a source-side light intensity distribution, as output by the at least one first light source, into the signalling output light intensity distribution, as required/desired for aircraft reward signal lighting.

According to a further embodiment, the signalling output light intensity distribution satisfies at least a sector of the Federal Aviation Regulation requirements for rearward navigation lights and/or of the Federal Aviation Regulation requirements for anti-collision lights. For the Federal Aviation Regulation (FAR) requirements for navigation lights, reference is made to section § 25.1385, which contains a reference to the ensuing sections §§ 25.1387 to 25.1397. Particular reference is made to sections §§ 25.1391 and 25.1393, which contain the requirements for the horizontal and vertical light intensity distributions. It is pointed out that said FAR requirements use the term position light instead of the term navigation light. For the Federal Aviation Regulation (FAR) requirements for anti-collision lights, reference is made to section § 25.1401. The vertical output light intensity distribution given therein applies to all horizontal angles and may be applied to both the white strobe anti-collision lighting and the red beacon lighting. The wording of the signalling output light intensity distribution satisfying at least a sector of the given requirements means that the light output of the aircraft rearward signal lighting exceeds the given values for a particular sector. This sector may be defined in terms of horizontal and vertical angles in accordance with the definitions of the FAR requirements.

According to a further embodiment, the signalling output light intensity distribution has a horizontal opening of at least 70°, in particular of between 70° and 90°, and/or a vertical opening angle of at least 90°, in particular of between 90° and 110°. In this way, the exterior aircraft light may cover a substantial sector of the desired/required aircraft rearward signal lighting of an aircraft. In particular, the signalling output light intensity distribution may have a horizontal opening angle of between 70° and 90° and a vertical opening of between 90° and 110°. In this way, four such exterior aircraft lights may jointly provide the rearward navigation light functionality, as required by the FAR. Each of those four exterior aircraft lights may satisfy the FAR requirements for rearward navigation lights in a quadrant thereof. The term opening angles refers to angular light output range of the exterior aircraft light. The terms horizontal opening angle and vertical opening angle refer to angular light output ranges on orthogonal axis of a coordinate system.

According to a further embodiment, the exterior aircraft light is configured to operate the at least one first light source in at least two modes of operation, which comprise a navigation mode of operation, wherein the at least one first light source continuously outputs light of a first light intensity, and an anti-collision mode of operation, wherein the at least one first light source outputs a sequence of light pulses, with the light pulses having a second light intensity. In a particular embodiment, the at least one first light source may be exactly one first light source and the first light intensity and the second light intensity may be achieved via different current levels in the navigation mode of operation and the anti-collision mode of operation. The second light intensity is different from the first light intensity.

In this way, aircraft rearward navigation lighting and aircraft rearward white strobe anti-collision lighting may be provided by the same structure within the exterior aircraft light, thus eliminating the need for separate lights for these two functionalities, as employed in previous approaches. The overall power consumption, wiring efforts, space constraints and/or other design constraints for the remainder of the aircraft may be reduced.

The same at least one first light source may be operated in both the navigation mode of operation and the anti-collision mode of operation. In both modes of operation, the light from the same at least one first light source may be refracted by the same at least one first optical system in the same way. Accordingly, the signalling output light intensity distribution may be the same in both modes of operation, only scaled by the different light intensities of the at least one first light source. In other words, the different functionalities may be implemented solely by the different light intensities and the different illumination sequences over time. In yet other words, the at least one first light source may have the same relative source-side light intensity distribution in both operating modes, and the aircraft rearward signal lighting may have the same relative signalling output light intensity distribution in both operating modes. Both the source-side light intensity distribution and the signalling output light intensity distribution may scale with the intensity of the light emitted from the at least one first light source.

According to a further embodiment, a ratio between the second light intensity and the first light intensity has a value of at least 15. With the ratio between the second light intensity and the first light intensity having a value of at least 15, i.e. with the second light intensity being at least 15 times as high as the first light intensity, and with the light emission being pulsed instead of continuous, the anti-collision mode of operation is implemented. Accordingly, the control of the at least one first light source decides which kind of light unit functionality is assumed at a given point in time.

The second light intensity may be measured at the respective peaks of the light pulses. The light pulses may have a rectangular form or any other suitable form, such as a sinusoidal form.

According to a particular embodiment, the ratio between the second light intensity and the first light intensity may have a value of between 15 and 25, in particular around 20. The ratio between the second light intensity and the first light intensity may also have a value of at least 20.

According to a further embodiment, the ratio between the second light intensity and the first light intensity is set in such a way that a ratio between an effective light intensity of the light pulses in the anti-collision mode of operation and the first light intensity has a value of at least 15. In this way, the subjective perception of the light intensity in the anti-collision mode of operation is taken into account. The term effective light intensity refers to a calculated light intensity value that takes into account the brightness perception of light flashes. In particular, the effective light intensity may take into account the light intensity course over time and the duration of the light pulses. In particular, the effective light intensity of a light flash may be calculated via the Blondel Rey equation, which is for example given in section § 25.1401 (e) of the FAR.

According to a particular embodiment, the ratio between the second light intensity and the first light intensity may have a value of between 30 and 50, in particular between 35 and 45, further in particular around 40. The ratio between the second light intensity and the first light intensity may also have a value of at least 40.

According to a particular embodiment, the ratio between the effective light intensity of the light pulses in the anti-collision mode of operation and the first light intensity may have a value of between 15 and 25, in particular of around 20. The ratio between the effective light intensity of the light pulses in the anti-collision mode of operation and the first light intensity may also have a value of at least 20.

An illustrative example of the application of the Blondel Rey equation is as follows. For rectangular light pulses having a duration of 200 ms and having a second light intensity of 40 times the first light intensity, the effective light intensity is 20 times the first light intensity.

According to a further embodiment, the at least one first optical system is configured in such a way that the signalling output light intensity distribution satisfies a predefined anti-collision mode light intensity distribution in the anti-collision mode of operation and a predefined navigation mode light intensity distribution in the navigation mode of operation. In other words, the at least one first optical system may condition the light from the at least one first light source in such a way that the light, when output from the exterior aircraft light, satisfies both a predefined anti-collision mode light intensity distribution and a predefined navigation mode light intensity distribution. Both the predefined anti-collision mode light intensity distribution and the predefined navigation mode light intensity distribution may comprise a set of minimum light intensity values for particular light emission directions, as for example given in the FAR.

The signalling output light intensity distribution may be a relative light intensity distribution whose shape may be the same in all modes of operation. The absolute light intensity distribution, emitted from the exterior aircraft light due to operation of the at least one first light source, may be the signalling output light intensity distribution multiplied by a scaling factor. This scaling factor depends on the intensity of the at least one first light source in the respective mode of operation.

According to a further embodiment, the value of the ratio between the second light intensity and the first light intensity corresponds substantially to the ratio between a peak intensity of the predefined anti-collision mode light intensity distribution and a peak intensity of the predefined navigation mode light intensity distribution. By establishing a correspondence between the peak intensities of the predefined anti-collision mode and navigation mode light intensity distributions and the first and second light intensities of the at least one first light source, the control of the exterior aircraft light may ensure that the light output by the exterior aircraft light fulfils the desired light intensities for both modes of operation, while consuming a low amount of power. In other words, the power consumption may be minimized under the condition that two predefined light intensity distributions in two operating modes are fulfilled with the same structure comprising the at least one first light source and the at least one first optical system. It is pointed out that it is not necessary that the ratio between the second light intensity and the first light intensity equals the ratio between a peak intensity of the predefined anti-collision mode light intensity distribution and a peak intensity of the predefined navigation mode light intensity distribution.

In an alternative embodiment, the value of the ratio between the second light intensity and the first light intensity may correspond substantially to the ratio between a peak intensity of the predefined anti-collision mode light intensity distribution and a peak intensity of the predefined navigation mode light intensity distribution, multiplied by a correction factor, which correction factor takes into account a perceived intensity of the light pulses. The correction factor may depend on the length of the light pulses and/or on their pulse shape over time. In this way, the perceived intensity of the light pulses in the anti-collision mode of operation may be brought into conformity with the desired or required design goals. An option for calculating said correction factor is the so-called Blondel Rey equation, discussed above.

According to a further embodiment, the signalling output light intensity distribution has a peak intensity of more than 300 cd, in particular of at least 400 cd in the anti-collision mode of operation. The signalling output light distribution may also have a peak intensity of more than 600 cd, in particular of at least 800 cd in the anti-collision mode of operation. In this case, the effective intensity of the light pulses may be more than 300 cd, in particular more than 400 cd.

According to a further embodiment, the signalling output light intensity distribution has a peak intensity of more than 15 cd, in particular of at least 20 cd in the navigation mode of operation.

According to a further embodiment, the first light intensity, i.e. the light intensity of the at least one first light source in the navigation mode of operation, and the second light intensity, i.e. the peak light intensity in the anti-collision mode of operation, are generated by respective levels of an illumination current through the at least one first light source. The first light intensity may be generated by a first level of the illumination current, while the second light intensity may be generated by a second level of the illumination current. With respect to LEDs, the current through the LED is determinative of the intensity emitted by the LED. Accordingly, the intensity may be easily controlled by the current. The first level of the illumination current corresponds to a dimmed operation of the at least one first light source as compared to the second level of the illumination current.

According to a further embodiment, the at least two modes of operation comprise a combined mode of operation, wherein the at least one first light source outputs a sequence of light pulses, with the light pulses having at least the second light intensity, and wherein the at least one first light source outputs light of at least the first light intensity between the light pulses. In this way, the exterior aircraft light may provide at least a portion of the rearward signal lighting functionality corresponding to a combination of an anti-collision light unit and a navigation light unit disposed next to each other and operating at the same time, as used in previous approaches. In the combined mode of operation, the light pulses may have the second light intensity and/or the light output between the light pulses may have the first light intensity. It is also possible that the light pulses have a light intensity above the second light intensity and/or that the light output between the light pulses has a light intensity above the first light intensity.

According to a further embodiment, the light pulses have a length of between 100 ms and 300 ms, in particular of around 200 ms.

Via the provision of the plurality of second light sources along the length of the housing, exemplary embodiments of the invention may allow for a beneficial compromise between efficiency and uniformity of illumination of the stabilizer. With the plurality of second light sources being distributed along the length of the housing, illumination of the stabilizer may be carried out from various positions along the stabilizer. In this way, the task of illuminating the stabilizer may be split up between light sources in different positions, which allows for the combination of more targeted light outputs. As compared to previous approaches, which relied on one or more light sources in a densely packed light unit, the distributed illumination of the stabilizer allows for less loss or stray light cast beyond and/or to the sides of the stabilizer and/or for less system complexity. Also, with the housing being configured to be mounted to the fuselage of the aircraft and with the exterior aircraft light thus having a set position with respect to the stabilizer, the illumination of the stabilizer may be kept constant during all phases of the flight. As compared to previous approaches, where an aircraft vertical stabilizer illumination light was arranged in a horizontal stabilizer, which moves for controlling the aircraft, the illumination of the stabilizer is more constant with the present approach. Exemplary embodiments of the invention can also allow for lower weights than previous approaches and/or may be produced and installed in a more cost-effective manner.

The housing has a length that is greater than the width and the height thereof. In this way, the exterior aircraft light has an elongated shape and has an elongated light output surface. As compared to previous approaches, where the light output surface was circular or close to quadratic, the maximum distance between two points of the light output surface is larger, allowing for a greater degree of freedom in shaping the output light intensity distribution of the light emitted by the plurality of second light sources.

The length, width, and height of the housing are the physical extensions of the housing, in case the housing has a cuboid form. If the outer contours of the housing do not jointly form a cuboid, the length, width, and height are defined as the dimensions of the cuboid circumscribing the housing.

The housing of the exterior aircraft light is configured to be mounted adjacent a horizontal and/or vertical stabilizer of the aircraft. In particular, the housing may be configured to be mounted along the stabilizer. Further in particular, the housing may be configured to be mounted along the stabilizer, with the length of the housing being arranged substantially along the stabilizer, i.e. along the front-to-back extension of the stabilizer in the aircraft frame of references.

According to a further embodiment, the plurality of second light sources are arranged in a substantially linear manner. In particular, the plurality of second light sources may be arranged within 15%, in particular within 5%, further in particular within 1%, of the width (W) from a longitudinal axis of the housing bisecting the width. In other words, the plurality of second light sources may be arranged in close proximity to a longitudinal axis of the housing. There may be provided a linear alignment of second light sources or substantially linear alignment thereof, e.g. as linear as customary manufacturing allows. The second light sources may be provided in one, two, or three rows, particularly in one row. With the plurality of second light sources being arranged in a substantially linear manner, the exterior aircraft light may provide for very uniform illumination conditions along the stabilizer to be illuminated. This is in particular the case, if the exterior aircraft light is mounted to the fuselage substantially in parallel to the foot/fuselage mounting portion of the stabilizer.

According to a further embodiment, the housing comprises a mounting structure. The housing may in particular be a mounting plate or a mounting structure that is u-shaped in cross-section. Also, the mounting structure may have a constant cross-section along the length. It is also possible that the cross-section along the length narrows towards one or both of the ends of the housing. This may help in providing favorable aerodynamic properties of the exterior aircraft light.

According to a further embodiment, the housing is configured for being mounted to an outside skin of the tail portion of the fuselage or the housing is configured to be inserted into a corresponding recess in the tail portion of the fuselage. The former may be achieved with a mounting structure in the form of a mounting plate. The latter may be achieved with a tub-shaped mounting structure, in particular with a mounting structure having a u-shaped cross-section along the length. In the latter case, the housing may be configured to extend out of the recess at its rear end region, such that the light from the at least one first light source may leave the exterior aircraft light rearwards in an unimpeded manner. While mounting the housing to the outside skin of the fuselage allows for a very easy and quick installation of the exterior aircraft light, inserting the mounting structure partially into a corresponding recess may provide for a very low aerodynamic impact of the exterior aircraft light.

According to a further embodiment, the housing further comprises a lens cover, in particular a lens cover resistant to temperatures in a range of from −55 to +70° C. and/or resistant to hydraulic fluid present in a jet aircraft operational environment. The temperature tolerance may be at least −30° C., or at least −40° C., or at least −50° C. Such temperature tolerances may allow the lens cover to survive harsh upper atmospheric air environments, including air, rain, and/or ice contact or flow-by at velocities of more than 500 km/h and up to 1000 km/h. With the lens cover being resistant to hydraulic fluid present in a jet aircraft operational environment, it may be ensured that the exterior aircraft light can work in an unimpeded manner, regardless of the jet engine exhaust that may reach the tail portion of the fuselage.

The lens cover may be formed as a single, contiguous sheet, i.e., one cast, extruded, or otherwise formed, in a single event and/or lacking breaks in the structure. Such a structure may have increased strength and/or decreased air or fluid resistance.

The housing, in particular the lens cover thereof, may comprise smoothed ends suitable to minimize air resistance in flight. In particular, the height of the housing may decrease towards one or both of the front end and the back end of the exterior aircraft light.

The lens cover may comprise glass, polycarbonate, or polymethylmethacrylate. In particular, the lens cover my essentially consist of or consist of glass, polycarbonate, or polymethylmethacrylate.

The lens cover may be rounded at its longitudinal ends, or tapering longitudinally outwardly from its longitudinal center. The lens cover may further or alternatively be rounded in the cross-section orthogonal to its longitudinal axis, e.g., as a half-pipe, or may be squared or v-shaped. If the exterior aircraft light is sunken into the fuselage, the lens cover may be flat or shaped like the fuselage, at least in a front portion thereof, such that the lens cover is flush with the aircraft fuselage in the front portion thereof. Such shaping may improve the aerodynamics of the exterior aircraft light and, thus, of the aircraft as a whole.

According to a further embodiment, the plurality of second light sources comprise 2 to 15, in particular 4 to 12, further in particular 6 to 9, second light sources per meter along the length of the housing. The exterior aircraft light may include a plurality of second light sources, such as 3 to 14 second light sources or 5 to 11 second light sources, in particular 5, 6, 7, 8, 9 or 10 second light sources. The provision of second light sources distributed along the longitudinal axis of the exterior aircraft light may allow for an improved, more targeted, and/or better focused illumination of the stabilizer. This illumination may have less stray light, which is not only more energy efficient, but also less disturbing to nearby pilots.

According to a further embodiment, the at least one and/or the plurality of second light sources are LEDs. Due to their small size, LEDs are particularly suitable for being used in large numbers. Also, they can be conveniently provided with individual optical systems, as described below. LEDs are further a very energy-efficient kind of light source and have a long life time.

The second light sources may be the same or different light sources, i.e., there may be 2, 3, 4, or more different types of second light sources in the exterior aircraft light. The exterior aircraft light may contain nominally identical second light sources for economic reasons. Also, the same light output per current may be achieved in a convenient manner by providing nominally identical second light sources. The second light sources may be connected in series, such that the same operating current is flown through the plurality of second light sources. Each second light source may be provided with a second optical system, as laid out below. Identical or different second optical systems may be provided upon identical or different light sources. Each second light source (and/or second optical system) may differ from each other, or there may be an alternating pattern, or a 1-2-3- . . . -1-2-3- . . . , 1-2-3- . . . -3-2-1, or 1-1-2-2-3-3-4-4- . . . - type pattern. Such patterns allow for tailoring the illumination shape and/or intensity without complicated circuitry or programming.

According to a further embodiment, the length of the housing is in a range of from 3 to 100 times, in particular 5 to 90 times, further in particular 15 to 80 times, further in particular 25 to 75 times, further in particular 50 to 70 times, the width of the housing. The longer profile of the exterior aircraft light may limit aerodynamic resistance and/or improve the projection of light onto the stabilizer, particularly in comparison to aircraft vertical stabilizer illumination lights with circular-shaped light output surfaces of previous approaches.

According to a further embodiment, the exterior aircraft light comprises, for each second light source, a second optical system, comprising a reflector, a lens, a shutter, or a combination of two or more of any of these. The optically effective components, i.e. the reflector, lens, and/or shutter, may make up at least 75 weight % of the second optical system. The second optical system may comprise a collimating reflector and a collimating lens, or consist essentially of, or consist of the collimating reflector and collimating lens. The collimating reflector and collimating lens may be arranged and configured to collimate separate portions of light emitted by a respective second light source. The collimating reflector may be hemispherical, partially spheroid, or parabolic, in shape.

It is also possible that the second optical system contains an extended reflector and or an extended lens and/or an extended reflector lens combination along a longitudinal axis of the housing. This extended second optical system may be arranged over and shape the light output of various second light sources. The extended second optical system may also block undesired portions of illumination, e.g. via shutters. It is also possible that non-transparent coating(s) are provided on the lens cover to block undesired portions of illumination.

According to a further embodiment, the exterior aircraft light has a peak light emission intensity in a range of from 1000 to 20000 cd, 1500 to 17500 cd, 2000 to 15000 cd, 2500 to 12500 cd, or 3000 to 10000 cd, emitted by the plurality of second light sources. It is also possible that the exterior aircraft light has a peak light emission intensity of at least 1000, at least 2500, at least 5000, at least 7500, or at least 10000 cd, emitted by the plurality of second light sources. Such high candela intensities may be useful in the conditions suitable to illuminate the a stabilizer of an aircraft, and/or useful in the case of an elongated and/or prismic exterior aircraft light to project at least 90%, at least 92.5%, at least 95%, at least 97.5%, or 99% of the light of the second light sources onto the stabilizer, distinct from the requirements of illuminators of potentially similar outer geometric shape, but different application.

According to a further embodiment, the exterior aircraft light has a stabilizer illumination opening angle of between 40° and 70°, in particular of between 45° and 60°, further in particular of about 50°, in at least one cross-section orthogonal to the length of the exterior aircraft light, for illuminating the stabilizer of the aircraft. The stabilizer illumination opening angle may be achieved by the combination of the plurality of second light sources and one or more second optical systems. Within this stabilizer illumination opening angle, the exterior aircraft light may have an asymmetric illumination pattern, particularly one directionally focused to outwardly and diagonally from its upper face. The stabilizer illumination opening angle and/or the illumination pattern may optionally hold for all cross-sections orthogonal to the longitudinal extension of the housing. Such a stabilizer illumination opening angle/such an illumination pattern allows for efficient illumination of a stabilizer. The stabilizer illumination opening angle may be circumferentially towards the stabilizer off the normal of a tangential plane to the top of the exterior aircraft light. This is based on the assumption that the tangential plane to the top of the exterior aircraft light is substantially parallel to the tangential plane of the fuselage of the aircraft at the mounting position of the exterior aircraft light.

According to a further embodiment, the stabilizer illumination may have a light emission intensity peak at an angle of between 20° and 40°, in particular between 25° and 35°, further in particular between 27.5° and 32.5°, to a normal to a tangential plane to the top of the exterior aircraft light. In this way, the light emission intensity peak may be at or close to the output direction towards the tip of the stabilizer, thus achieving a bright illumination thereof despite the comparable large distance to the tip. The given angles are again defined in a cross-section orthogonal to the longitudinal extension of the exterior aircraft light. The described features may be present in one or more or all cross-sections orthogonal to the longitudinal extension of the housing.

According to a further embodiment, the total stray light emission of the plurality of second light sources of the exterior aircraft light, i.e. the light not illuminating the stabilizer, but passing the front, rear and top/side edges of the stabilizer, is less than 25%, less than 20%, less than 15%, less than 10%, less than 5%, less than 2.5%, or less than 1%, given as a percentage of total light emission of the plurality of light sources of the exterior aircraft light. By limiting stray light, the exterior aircraft light can save energy, can reduce long term costs, and can be less disturbing to nearby pilots.

According to a further embodiment, the exterior aircraft light, in particular the housing thereof, may have a width in a range of from 25 to 75 mm, in particular from 35 to 65 mm, further in particular from 45 to 55 mm, and/or a height in a range of from 10 to 50 mm, in particular from 15 to 40 mm, further in particular from 20 to 30 mm. In addition to or independently from these dimensions, the aircraft vertical stabilizer light, in particular the housing thereof, may have a length of from 500 mm to 3500 mm, in particular of from 1000 mm to 3000 mm, further in particular of from 1500 mm to 2500 mm. The exterior aircraft light may have, for example, dimensions of 15 to 30 mm high, 40 to 60 mm wide, and 1000 to 2500 mm long e.g., 25×50×2000 mm. It is also possible that the height and the width are substantially the same or very similar to each other, e.g. within 10% of each other.

According to a further embodiment, the exterior aircraft light may have a weight in a range of from 0.25 to 5 kg, in particular between 0.5 and 3 kg, further in particular between 0.5 and 1 kg.

Exemplary embodiments of the invention further include an aircraft, such as an airplane, comprising at least one exterior aircraft light, as described in any of the exemplary embodiments above. The additional features, modifications, and effects, described above with respect to the exterior aircraft light, apply to the aircraft in an analogous manner. The aircraft may for example have two or four exterior aircraft lights, as described in any of the exemplary embodiments above.

Exemplary embodiments of the invention further include an aircraft, such as an airplane, comprising a fuselage having a tail portion, a vertical stabilizer, a left horizontal stabilizer, a right horizontal stabilizer, a first exterior aircraft light, mounted to the tail portion of the fuselage between the vertical stabilizer and the left horizontal stabilizer, a second exterior aircraft light, mounted to the tail portion of the fuselage between the vertical stabilizer and the right horizontal stabilizer, a third exterior aircraft light, mounted to the tail portion of the fuselage below the left horizontal stabilizer, and a fourth exterior aircraft light, mounted to the tail portion of the fuselage below the right horizontal stabilizer. The first, second, third and fourth exterior aircraft lights are in accordance with any of the exemplary embodiments described above. The additional features, modifications, and effects, described above with respect to the exterior aircraft light, apply to all or a subset of the first to fourth exterior aircraft lights of the aircraft in an analogous manner.

According to a further embodiment, the first, second, third and fourth exterior aircraft lights may be arranged in a symmetric manner. In particular, the first and third exterior aircraft lights may be arranged mirror symmetrically to the second and fourth exterior aircraft lights, in particular with respect to a vertical symmetry plane running through the vertical stabilizer. Further in particular, the first and second exterior aircraft lights and the third and fourth exterior aircraft lights may be respective mirror embodiments of each other.

According to a further embodiment, each of the first, second, third and fourth exterior aircraft lights satisfies at least a quadrant of the Federal Aviation Regulation (FAR) requirements for rearward navigation lights and/or at least a quadrant of a corresponding sector of the Federal Aviation Regulation (FAR) requirements for anti-collision lights. In this way, the first to fourth exterior aircraft lights may jointly provide a desired/required rearward navigation and/or anti-collision lighting functionality.

Exemplary embodiments of the invention further include a method of operating an exterior aircraft light mounted to a tail portion of a fuselage of an aircraft, comprising providing aircraft rearward signal lighting from a rear end region of the exterior aircraft light via at least one first light source, and providing distributed illumination of a stabilizer of the aircraft via a plurality of second light sources, which are arranged spaced along the exterior aircraft light. The additional features, modifications, and effects, described above with respect to the exterior aircraft light, apply to the method of operating an exterior aircraft light in an analogous manner.

The providing of aircraft rearward signal lighting and the providing of distributed illumination of a stabilizer of the aircraft may take place simultaneously, i.e. at the same point in time, or at different points in time. In other words, the method may provide aircraft rearward signal lighting and distributed illumination of a stabilizer of the aircraft independently from each other. The exterior aircraft light, described above, may also be configured to operate the at least one first light source and the plurality of second light sources independently from each other.

BRIEF DESCRIPTION OF THE DRAWINGS

Further exemplary embodiments of the invention will be described with respect to the accompanying Figures.

FIG. 2 shows an exterior aircraft light in accordance with an exemplary embodiment of the invention;

DETAILED DESCRIPTION

Figure 1:
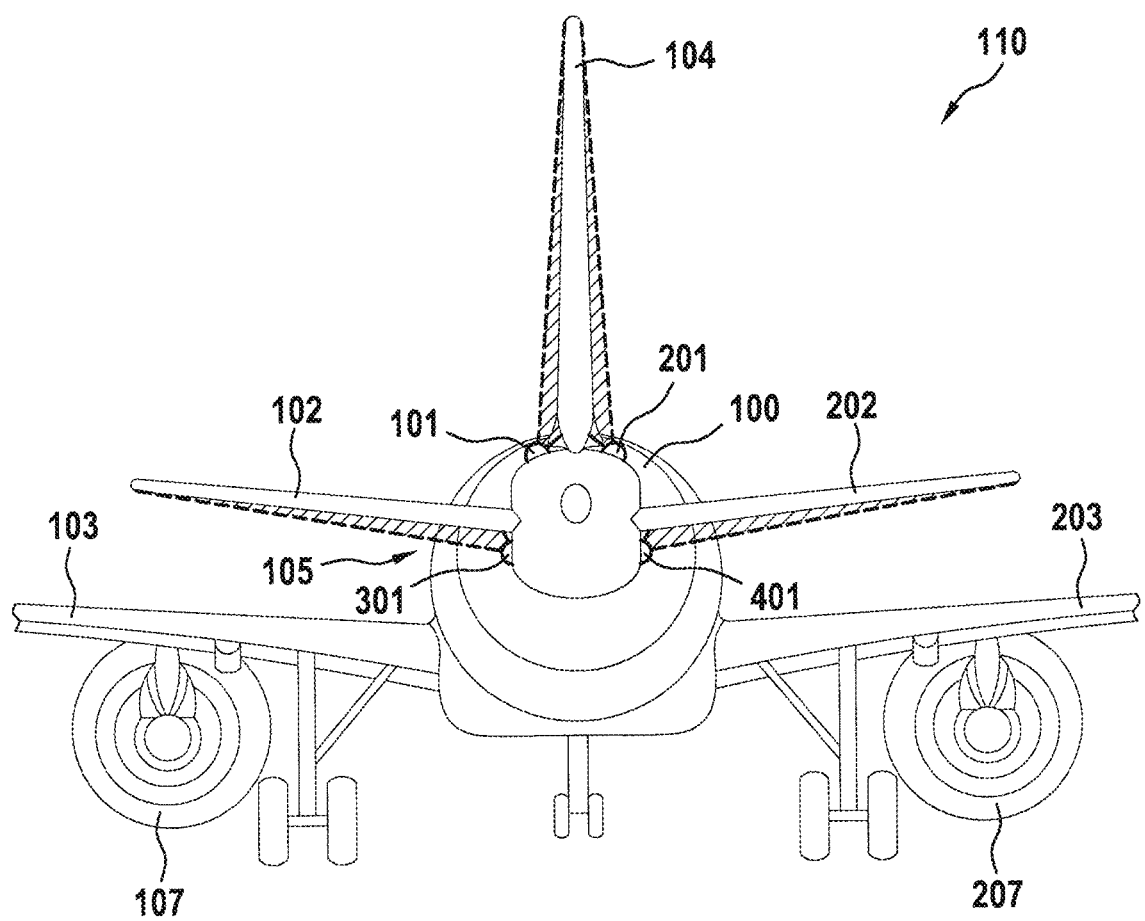
FIG. 1 shows an aircraft in accordance with an exemplary embodiment of the invention in a rear view, the aircraft being equipped with four exterior aircraft lights in accordance with exemplary embodiments of the invention.

FIG. 1 shows an aircraft 110, in particular a large commercial passenger airplane, in accordance with an exemplary embodiment of the invention in a rear view. The aircraft 110 has a fuselage 100, a left wing 103, provided with a left engine 107, a right wing 203, provided with a right engine 207, a left horizontal stabilizer 102, a right horizontal stabilizer 202, and a vertical stabilizer 104. The left horizontal stabilizer 102, the right horizontal stabilizer 202, and the vertical stabilizer 104 are provided in a tail portion 105 of the fuselage 100.

The aircraft 110 is equipped with four exterior aircraft light units 101, 201, 301, 401 in accordance with exemplary embodiments of the invention. Each of the exterior aircraft lights 101, 201, 301, 401 has dual purpose, namely to illuminate a surface of one of the stabilizers of the aircraft and to provide rearward signal lighting. These functionalities will be described in detail below. In FIG. 1, the illumination of the respective stabilizer surfaces is illustrated by hatched cones, illustrating the respective light outputs of the exterior aircraft lights towards the respective stabilizer surfaces. The rearward signal lighting is not illustrated in FIG. 1, as it is output towards the observer of FIG. 1, but will be described in detail below.

The first exterior aircraft light 101 in operation illuminates the left side of the vertical stabilizer 104 and provides rearward signal lighting. The second exterior aircraft light 201 in operation illuminates the right side of the vertical stabilizer 104 and provides rearward signal lighting. The third exterior aircraft light 301 in operation illuminates the underside of the left horizontal stabilizer 102 and provides rearward signal lighting. The fourth exterior aircraft light 401 in operation illuminates the underside of the right horizontal stabilizer 202 and provides rearward signal lighting. In the exemplary embodiment of FIG. 1, the first exterior aircraft light 101, the second exterior aircraft light 201, the third exterior aircraft light 301, and the fourth exterior aircraft light 401 jointly provide rearward navigation lighting and rearward white strobe anti-collision lighting for the aircraft 110. This will be described in detail below.

FIG. 2 shows an exterior aircraft light 101 in accordance with an exemplary embodiment of the invention in a side view. The exterior aircraft light 101 may be used as the first exterior aircraft light 101 of FIG. 1, provided inter alia for illuminating the underside of the left horizontal stabilizer 102. The exterior aircraft light 101 is shown from the left in the aircraft frame of reference. It is understood and apparent to the skilled person that the exterior aircraft light 101 may also be used for the other exterior aircraft lights, depicted in FIG. 1, upon re-arrangement of individuals components and/or re-orientation/mirroring of individual components and/or adjustments regarding the light output angles.

The exterior aircraft light 101 has a housing 2, having a fuselage mounting plate 4 and a lens cover 6. The fuselage mounting plate 4 and the lens cover 6 form an inner space where the light sources and optical systems are arranged, as will be described below. The housing 2 has a front end region 30 and a rear end region 32. The orientation of the exterior aircraft light 101 is further illustrated by arrow 34, which indicates the aircraft rear direction. Accordingly, in the viewing direction of FIG. 1, the rear end region 32 is visible.

The exterior aircraft light 101 comprises a first light source 10 and a first optical system 12. The first light source 10 and the first optical system 12 are arranged on a first mounting plate 14 in the rear end region 32 of the exterior aircraft light 101. The first light source 10 and the first optical system 12 face rearward, i.e. generally in the rear direction 34 of the aircraft. For this purpose, the first mounting plate 14 is generally orthogonal to the fuselage mounting plate 4. In the exemplary embodiment of FIG. 1, the first light source 10 is a first LED.

The exterior aircraft light 101 further comprises a plurality of second light sources 20. Each second light source 20 is associated with a respective second optical system 22, and these associated components are respectively arranged on a second mounting plate 24. In the exemplary embodiment of FIG. 2, six second light sources 20 are provided. The second mounting plates 24 are generally parallel to the fuselage mounting plate 4. It is also possible that the second light sources 20 and the second optical systems 22 are arranged directly on the fuselage mounting plate 4.

The exterior aircraft light 101 of FIG. 2 has a dual purpose, namely to provide rearward signal lighting via the first light source 10 and the first optical system 12 and to provide illumination of a stabilizer surface of the aircraft via the plurality of second light sources 20 and the associated plurality of second optical systems 22. In order to receive power and control information, the exterior aircraft light 101 has four electrical connections in the exemplary embodiment of FIG. 2. A first electrical connection 40 is a ground connection. A second electrical connection 42 is an anti-collision mode power connection. A third electrical connection 44 is a navigation mode power connection. A fourth electrical connection 46 is a stabilizer illumination power connection. Via each of the second, third, and fourth electrical connections 42, 44, 46, an appropriate amount and time sequence of power is supplied to the exterior aircraft light 101 for the desired lighting functionality. Via the second electrical connection 42, pulsed current is provided to the first light source 10, which results in an intermittent/flashing light emission by the first light source 10, thus achieving anti-collision lighting. Via the second electrical connection 44, a continuous stream of power is provided to the first light source 10, which results in a continuous light output for navigation lighting. Via the fourth electrical connection 46, a continuous stream of power is provided to the plurality of second light sources 20 for illuminating the desired stabilizer surface. A control unit may be provided outside of the exterior aircraft light 101 and supply power via the second, third and fourth electrical connections 42, 44, 46 for achieving a desired light output at any point in time. However, it is also possible that more of the control functionality is provided within the exterior aircraft light 101. For example, it is possible that the exterior aircraft light 101 has a power input and a control input and that the exterior aircraft light 101 itself generates appropriate supplies of electrical power to the first power source and the plurality of second power sources 20, depending on the information received via the control input.

The rearward signal lighting functionality and the stabilizer illumination functionality of the exterior aircraft light 101 will be described in detail below with respect to the remaining Figures. While FIGS. 3 to 7 relate to the rearward signal lighting, FIGS. 8 to 11 relate to the stabilizer illumination.

Figure 3A:
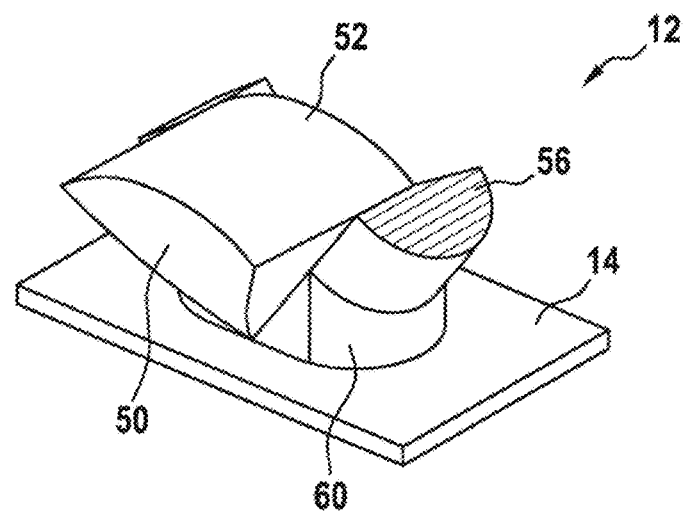
FIG. 3A shows the aircraft rearward signalling part of the exterior aircraft light of FIG. 2 in a perspective views.
Figure 3B:
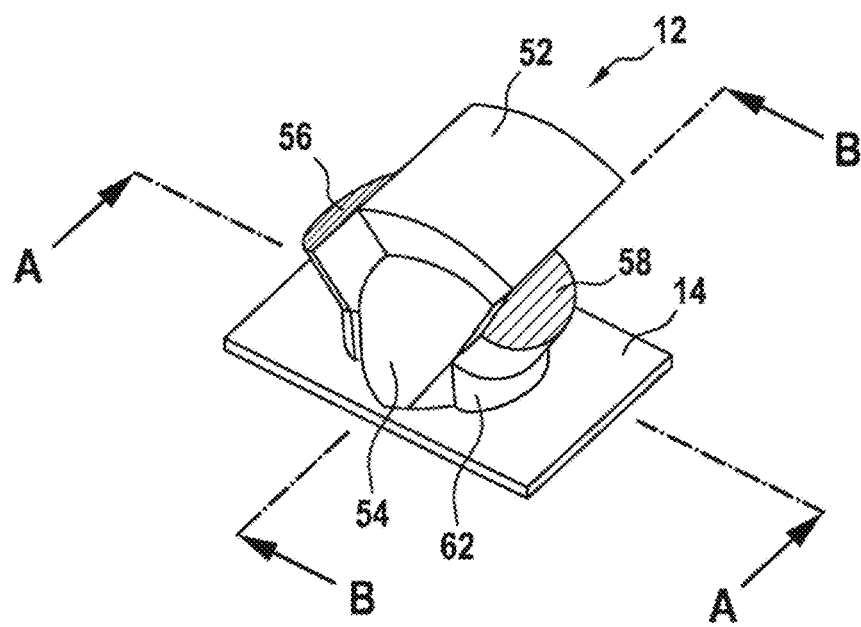
FIG. 3B shows the aircraft rearward signalling part of the exterior aircraft light of FIG. 2 in a perspective views.

FIG. 3 shows the first optical system 12 and the first mounting plate 14 of the exterior aircraft light 101 of FIG. 2 in a lower perspective view in FIG. 3A and in an upper perspective view in FIG. 3B. The first light source 10 is not visible in the viewing directions of FIG. 3A and FIG. 3B, because it is arranged between the first optical system 12 and the first mounting plate 14. The first mounting plate 14 may be a printed circuit board that provides mechanical support for the first light source 10 and the first optical system 12 as well as power supply to the first light source 10.

In the exemplary embodiment of FIG. 3, the first optical system 12 is a lens with various optically effective surfaces. In particular, the lens of FIG. 3 has a total internal reflection surface 50, a first central light output surface 52, a second central light output surface 54, a first lateral light output surface 56, a second lateral light output surface 58, a first shutter 60, and a second shutter 62. The optical effects of these surfaces will be described below with reference to FIG. 4. The lens may be made from any suitable refractive material, for example from PMMA, PC, silicone, glass, etc. It is pointed out that the first optical system 12 may have many different forms and may comprise various different elements, such as reflecting elements, refracting elements, shutters, etc. While the given lens is an efficient means of generating a desired signalling output light intensity distribution, it is apparent to the skilled person that other approaches are possible as well.

Figure 4A:
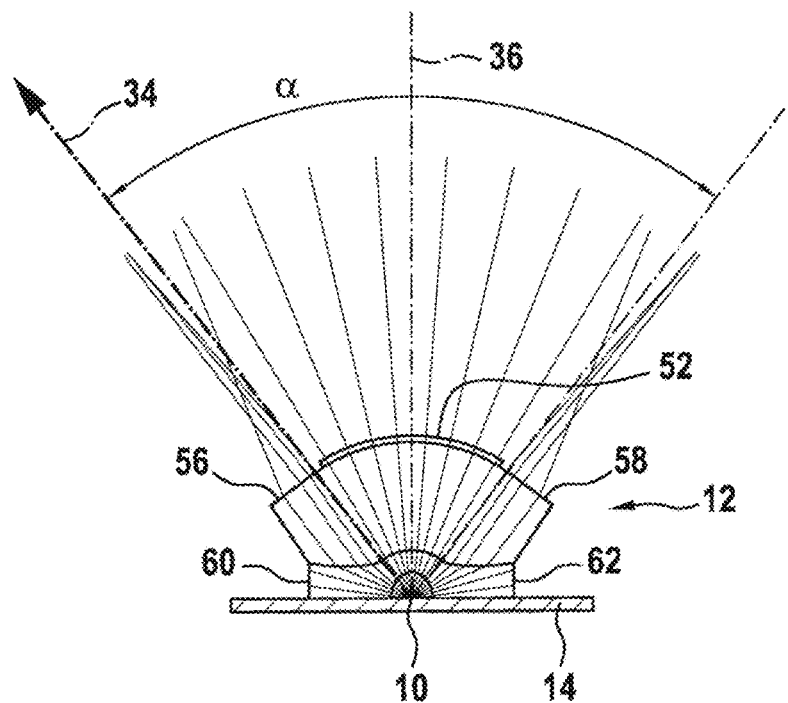
FIG. 4A shows a cross-sectional views through the aircraft rearward signalling part of the exterior aircraft light of FIG. 2.

FIG. 4A shows a horizontal cross-sectional view through the first light source 10, the first optical system 12, and the first mounting plate 14. The cross-sectional plane of FIG. 4A is indicated by the dashed line A-A in FIG. 3B. The cross-sectional plane of FIG. 4A is referred to as horizontal cross-sectional plane, because this cross-sectional plane comes to lie horizontally in the aircraft frame of reference when the exterior aircraft light is mounted on the aircraft.

The optical effect of the various optical surfaces is now described with respect to a central light emission direction 36, orthogonal to the first mounting plate 14, and illustrated by various light rays. The light around the central light emission direction 36 passes the lens 12 fairly unaltered. In other words, the first central light output surface 52 does not have a big refractive impact on the passing light. The first and second lateral light output surfaces 56, 58 are stripe optics that refract light towards the central light emission direction 36. The first and second shutters 60, 62 block light from exiting the first optical system 12 at small angles with respect to the first mounting plate 14. In this way, a horizontal opening angle $\alpha$ of about 70° is achieved.

The central light emission direction 36 is angled at about 35° with respect to the aircraft rear direction 34. In this way, the light output covers about 70° horizontally between the aircraft rear direction 34 and a right rear direction of the aircraft. In this way, the exterior aircraft light 101 is able to cover about half of the horizontal opening angle required by FAR regulations for rearward navigation lights.

Figure 4B:
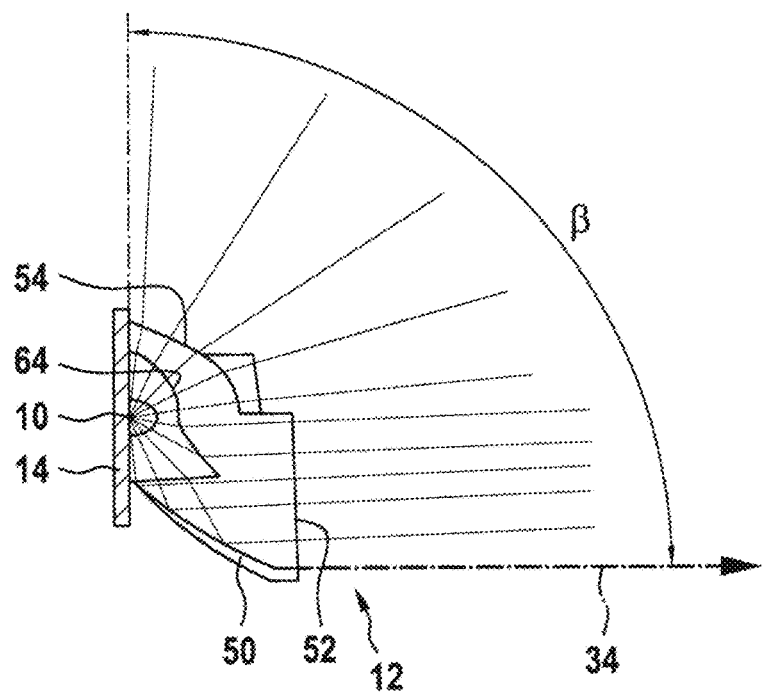
FIG. 4B shows a cross-sectional views through the aircraft rearward signalling part of the exterior aircraft light of FIG. 2.

FIG. 4B shows a vertical cross-sectional view through the first light source 10, the first optical system 12 and the first mounting plate 14. The cross-sectional plane of FIG. 4B is indicated by dashed line B-B in FIG. 3B. The cross-sectional plane of FIG. 4B is referred to as vertical cross-sectional plane, because this cross-sectional plane comes to lie vertically in the aircraft frame of reference when the exterior aircraft light 101 is mounted on the aircraft.

The total internal reflection surface 50 collimates a portion of the light from the first light source 10 in or close to the rear direction 34. Again, the light passes the first central light output surface 52 in a substantially unaltered manner. The second central light output surface 54 provides for some refraction of the light from the first light source 10. Overall, the total internal reflection surface 50, the first central light output surface 52, the second central light output surface 54 and an internal refractive surface 64 of the lens 12 provide for the desired transformation from the source-side light intensity distribution of the first light source 10 into the desired signalling output light intensity distribution.

The signalling output light intensity distribution has an opening angle $\beta$ of about 90° in the vertical cross-sectional plane, depicted in FIG. 4B. In this way, the signalling output light intensity distribution is able to satisfy the upper half of the FAR requirements for navigation lights, as will be described in more detail below.

It is also possible that the opening angle $\beta$ is larger than 90°. In particular, it is possible that the opening angle $\beta$ is about 100°, for example due to the first light source 10 not being an ideal point light source and its image extending the opening angle $\beta$. With the opening angle $\beta$ being above 90°, it is possible to tilt the first light source 10 and the first optical system 12 downwards. In this way, some light is still emitted straight up, i.e. at a vertical angle of 90° with respect to the aircraft rear direction, while more of the light output is concentrated around the horizontal plane.

While it has been described that the first light source 10 and the first optical system 12 of the exterior aircraft light 101 of FIGS. 2 to 4 can satisfy rearward navigation lighting requirements for a sector of those requirements, the signalling output light intensity distribution can also satisfy anti-collision light requirements upon increasing the light intensity and providing pulsed power to the first light source 10. The first light source can be operated in a navigation mode of operation and an anti-collision mode of operation. This will be described in detail below with respect to FIGS. 6 and 7.

Figure 5A:
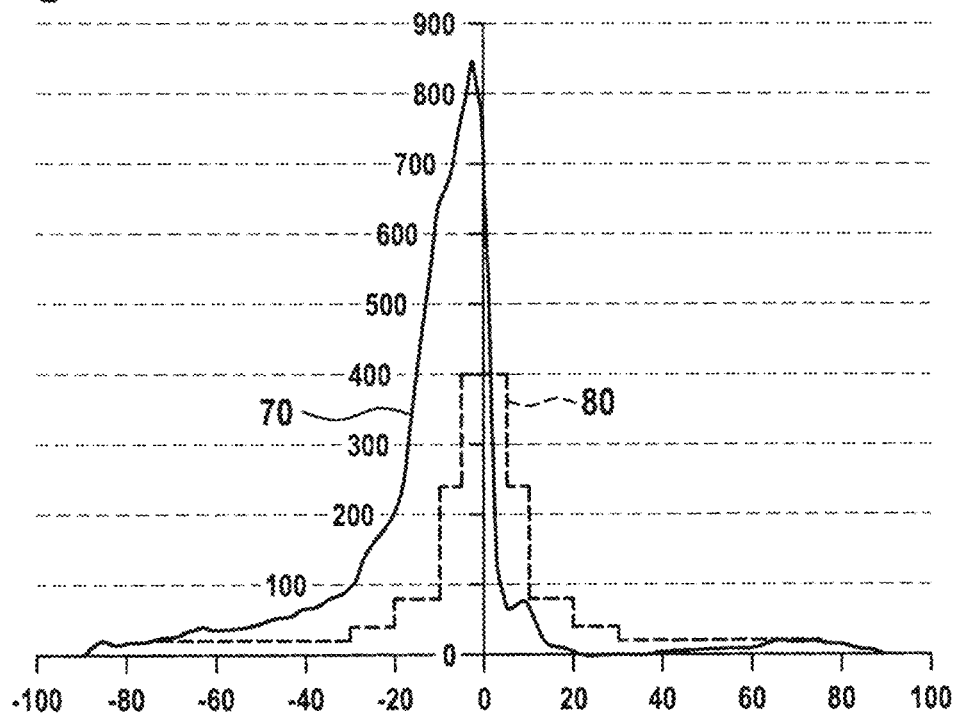
FIG. 5A shows an exemplary signalling output light intensity distributions of one and two exterior aircraft lights in accordance with exemplary embodiments of the invention.

FIG. 5A shows a signalling output light intensity distribution of an exterior aircraft light in accordance with an exemplary embodiment of the invention, with the first light source being operated in the anti-collision mode of operation, in the vertical cross-section plane of FIG. 4B. As the depicted signalling output light intensity distribution is for the anti-collision mode of operation, it is also referred to as anti-collision output light intensity distribution 70. For comparison, the Federal Aviation Regulation (FAR) requirements for the vertical distribution of anti-collision lighting are given as a dashed curve, also referred to as predefined anti-collision mode light intensity distribution 80. It can be seen that the anti-collision output light intensity distribution 70 satisfies the FAR requirements for half of the vertical angular range, namely for the upper half, i.e. for the angles above the horizontal cross-sectional plane through the exterior aircraft light.

Figure 5B:
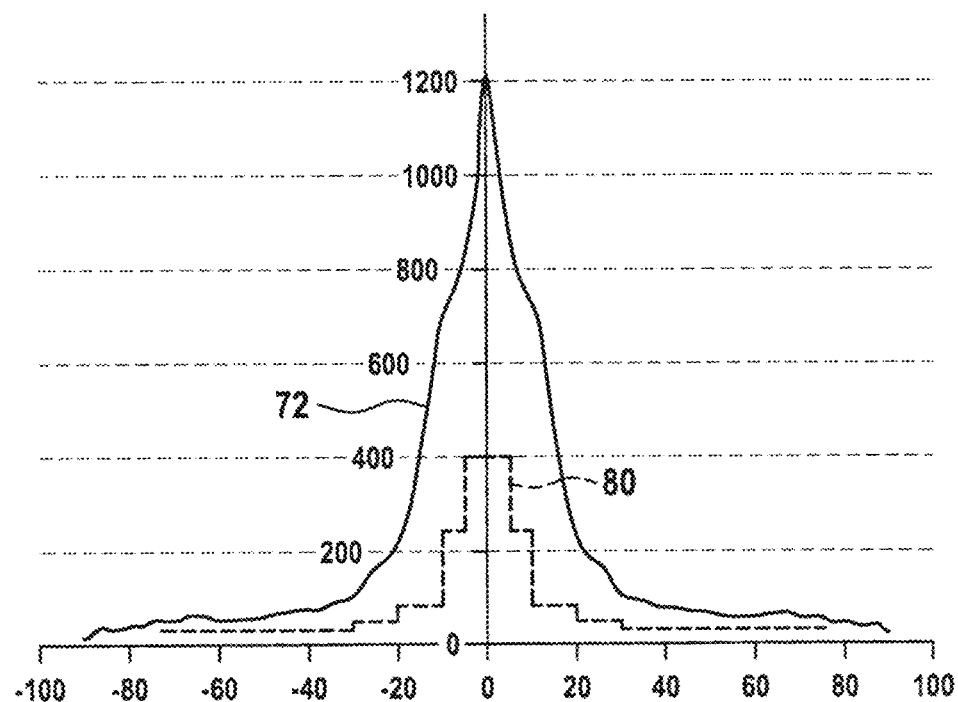
FIG. 5B shows an exemplary signalling output light intensity distributions of one and two exterior aircraft lights in accordance with exemplary embodiments of the invention.

FIG. 5B shows a signalling output light intensity distribution of two exterior aircraft lights in accordance with exemplary embodiments of the invention, with the respective first light sources being operated in the anti-collision mode of operation, in the vertical cross-section plane of FIG. 5A. In particular, the joined anti-collision output light intensity distribution 72 may belong to the first and third exterior aircraft lights 101, 301 of FIG. 1, when operated in the anti-collision mode of operation. It can be seen that the joined anti-collision output light intensity distribution 72 satisfies the FAR requirements for the whole vertical angular range, i.e. for all angles above and below the horizontal cross-sectional plane through the exterior aircraft light. In this way, the two exterior aircraft lights work together to fulfil the FAR requirements for anti-collision lights for the depicted as well as various other vertical cross-sectional planes.

Figure 6A:
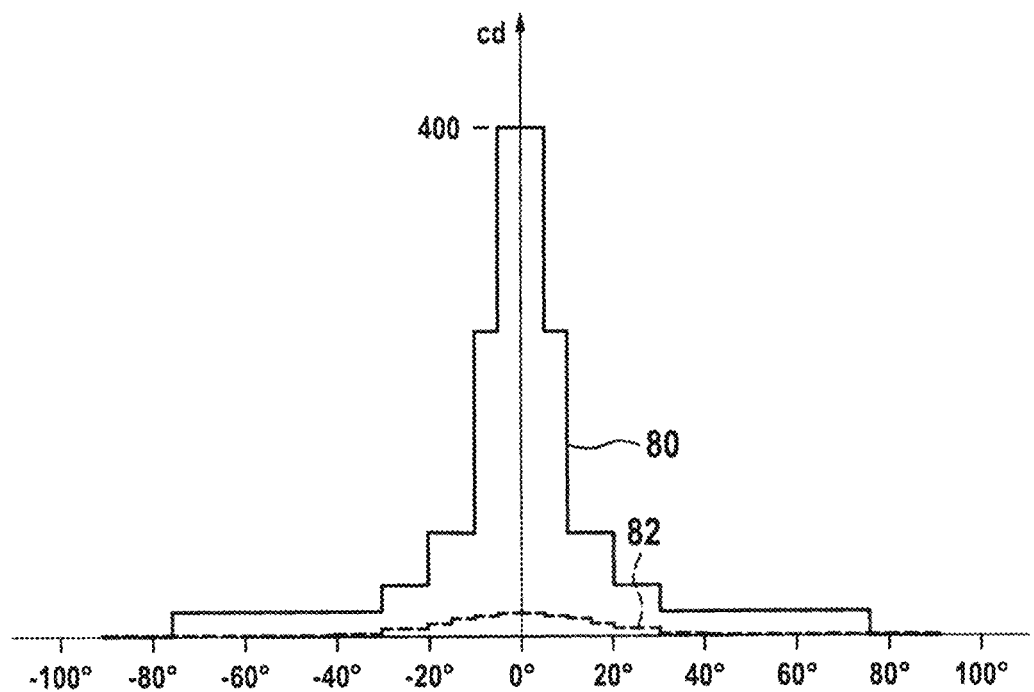
FIG. 6A shows an exemplary light intensity distributions relevant to the signalling output light intensity distributions of exterior aircraft lights in accordance with exemplary embodiments of the invention.

FIG. 6A shows an exemplary embodiment of a predefined anti-collision mode light intensity distribution 80, defined by the FAR requirements for the respective angles, and an exemplary embodiment of a predefined navigation mode light intensity distribution 82, defined by the FAR requirements for the respective angles, in a vertical cross-sectional plane. The light intensity distributions 80 and 82 are given in terms of angles with respect to the horizontal direction.

The predefined anti-collision mode light intensity distribution 80 and the predefined navigation mode light intensity distribution 82 are required light intensity distributions for an anti-collision light and a navigation light, respectively, according to Federal Aviation Regulations (FAR). The depicted courses of the light intensity distributions indicate minimum values in accordance with the FAR. Accordingly, for an anti-collision light or a navigation light to be in accordance with the respective FAR requirements, the output light intensity distributions must be above the shown course for all angles.

The exemplary predefined anti-collision mode light intensity distribution 80 requires the following minimum light intensity values in the vertical cross-sectional plane. A light intensity of 400 cd is required for a range between +5° and −5° with respect to the horizontal. A light intensity of 240 cd is required for a range between +/−5° and +/−10° with respect to the horizontal. A light intensity of 80 cd is required for a range between +/−10° and +/−20° with respect to the horizontal. A light intensity of 40 cd is required for a range between +/−20° and +/−30° with respect to the horizontal. A light intensity of 20 cd is required for a range between +/−30° and +/−75° with respect to the horizontal. These required values may be absolute values or effective light intensity values which take into account the observer's perception, as discussed above.

The exemplary predefined navigation mode light intensity distribution 82 requires the following minimum light intensity values in the vertical cross-sectional plane. A light intensity of 20 cd is required in the principal light emission direction, i.e. in the horizontal. A light intensity of 18 cd is required for a range between 0° and +/−5° with respect to the horizontal. A light intensity of 16 cd is required for a range between +/−5° and +/−10° with respect to the horizontal. A light intensity of 14 cd is required for a range between +/−10° and +/−15° with respect to the horizontal. A light intensity of 10 cd is required for a range between +/−15° and +/−20° with respect to the horizontal. A light intensity of 6 cd is required for a range between +/−20° and +/−30° with respect to the horizontal. A light intensity of 2 cd is required for a range between +/−30° and +/−40° with respect to the horizontal. A light intensity of 1 cd is required for a range between +/−40° and +/−90° with respect to the horizontal.

Figure 6B:
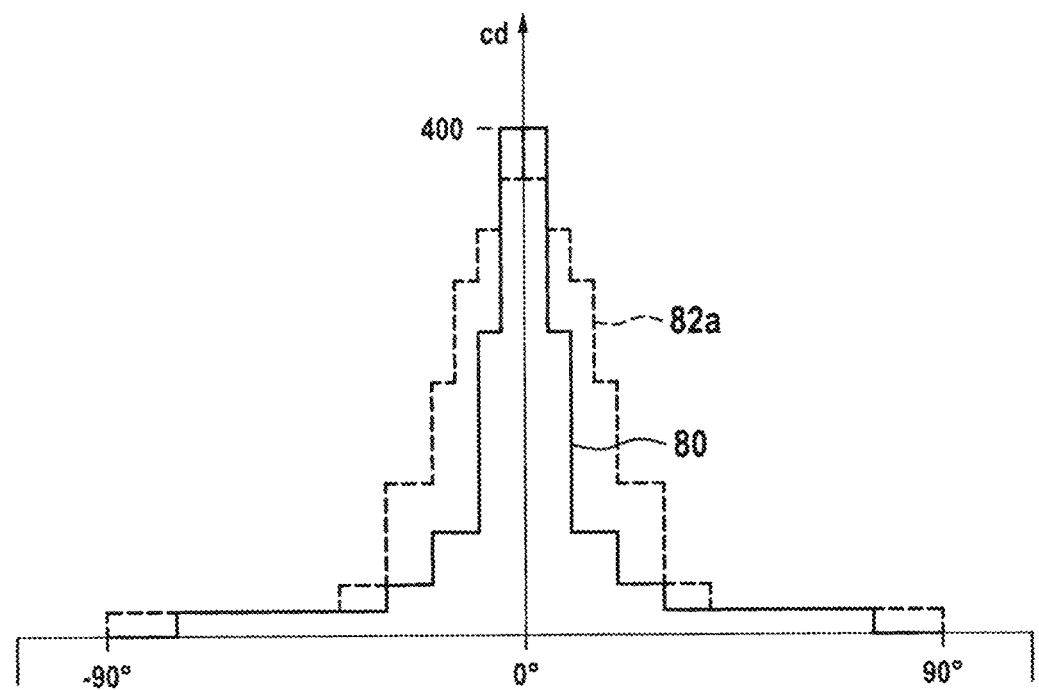
FIG. 6B shows an exemplary light intensity distributions relevant to the signalling output light intensity distributions of exterior aircraft lights in accordance with exemplary embodiments of the invention.

FIG. 6B shows the predefined anti-collision mode light intensity distribution and the predefined navigation mode light intensity distribution of FIG. 6A, scaled to a normalized peak intensity. In particular, the predefined anti-collision mode light intensity distribution 80 of FIG. 6B is the same as in FIG. 6A.

However, the scaled version 82a of the predefined anti-collision mode light intensity distribution 82 is the predefined navigation mode light intensity distribution 82 of FIG. 6A multiplied by the factor 20. The factor 20 stems from the fact that the peak intensity of the predefined anti-collision mode light intensity distribution 80 is 20 times as high as the peak intensity of the predefined navigation mode light intensity distribution 82. As can be seen from FIG. 6B, the predefined anti-collision mode light intensity distribution 80 and the scaled version 82a of the predefined navigation mode light intensity distribution 82 have the same peak intensity of 400 cd.

Figure 6C:
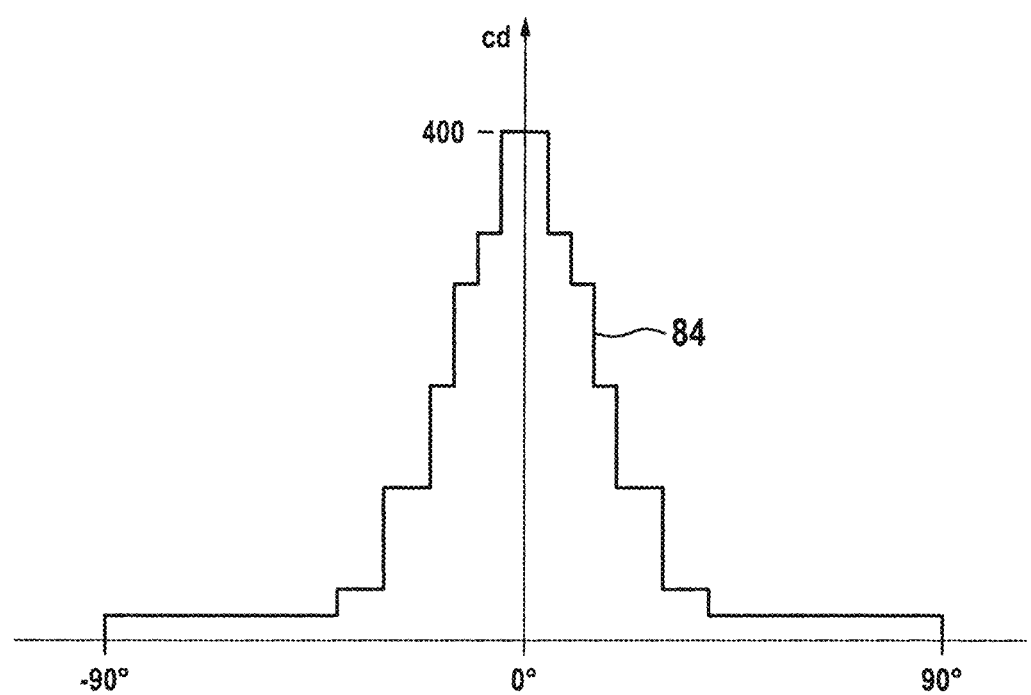
FIG. 6C shows an exemplary light intensity distributions relevant to the signalling output light intensity distributions of exterior aircraft lights in accordance with exemplary embodiments of the invention.

In FIG. 6C, a compound light intensity distribution 84 is shown, which is the result of a combination of the predefined anti-collision mode light intensity distribution 80 and the scaled version 82a of the predefined navigation mode light intensity distribution 82. The compound light intensity distribution 84 is derived from the light intensity distributions 80 and 82a in such a way that the more restrictive requirement of the two light intensity distributions is chosen for each angle. In other words, the compound light intensity distribution 84 is derived by tracing the respectively upper one of the two light intensity distributions 80 and 82a along the angular axis. This compound light intensity distribution 84 has a very particular property. If a light unit emits light with the compound light intensity distribution 84, said light unit satisfies the FAR requirements for an anti-collision light. Moreover, if a light unit emits the compound light intensity distribution 84, with the intensity values over all angles being divided by 20, the light unit satisfies the FAR requirements for a navigation light. Accordingly, the compound light intensity distribution 84 has a shape that, when scaled properly, satisfies both the predefined anti-collision mode light intensity distribution 80 and the predefined navigation mode light intensity distribution 82. In other words, the compound light intensity distribution 84 is an example of a relative output light intensity distribution that is suitable for both an anti-collision light and a navigation light according to the FAR.

Based on these consideration, the at least one first optical system 12 has such a design that it transforms the light intensity distribution of the at least one first light source 10, which may for example be Gaussian or Lambertian for the at least one first light source 10 being a single LED, into a signalling output light intensity distribution that satisfies the relative requirements of the compound light intensity distribution 84. The satisfaction of the absolute predefined anti-collision mode light intensity distribution 80 and the predefined navigation mode light intensity distribution 82 is then achieved via a scaling of the light intensity output by at least one first light source 10. This light intensity is in turn controlled by the illumination current flown through the at least one first light source in operation.

FIG. 7 shows three light intensity sequences over time, implementing a navigation mode of operation, an anti-collision mode of operation, and a combined mode of operation. With respect to the light intensity distributions of FIG. 6, which show the distributions in the vertical plane, the intensity value at the angle of 0° is shown in FIG. 7. In other words, the intensity values shown in FIG. 7 are the light intensities emitted by the at least one first light source in a horizontal direction.

Figure 7A:
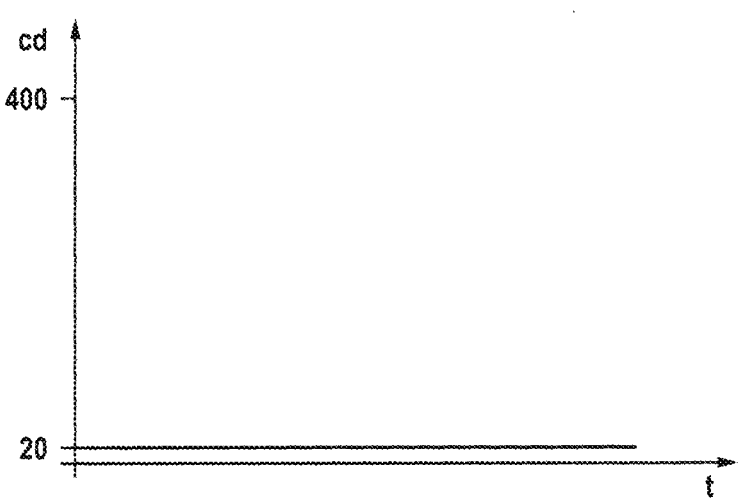
FIG. 7A shows exemplary courses of an output light intensity of the aircraft rearward signalling part of an exterior aircraft light in accordance with an exemplary embodiment of the invention over time in one mode of operation.

FIG. 7A shows a first light intensity course over time. The first light intensity course has a constant value of 20 cd. In this way, the first light intensity course is in accordance with the requirements of the navigation mode of operation, which requires a continuous output of light. Also, the value of 20 cd is in accordance with the peak value of the predefined navigation mode light intensity distribution 82, shown in FIG. 6A.

Figure 7B:
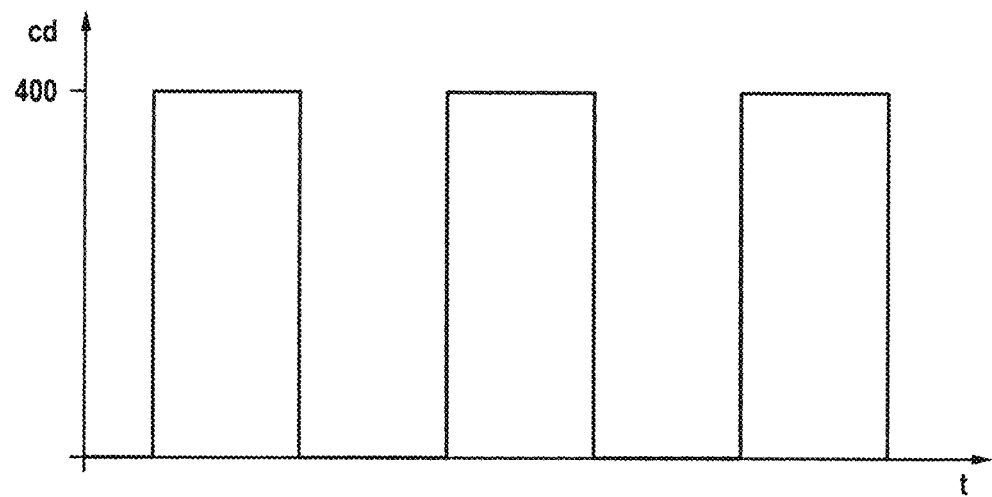
FIG. 7B shows exemplary courses of an output light intensity of the aircraft rearward signalling part of an exterior aircraft light in accordance with an exemplary embodiment of the invention over time in one mode of operation.

FIG. 7B shows a second light intensity course over time. The second light intensity course has a pulsed shape. It comprises a sequence of equally high, equally long pulses that are separated by intervals of no light being emitted. In this way, the second light intensity course is in accordance with the requirements of the anti-collision mode of operation, which requires a sequence of light pulses, also referred to as a sequence of light flashes or a strobe operation. In the exemplary embodiment of FIG. 4B, the pulses are rectangular pulses. The intervals of no light being emitted are as long as the pulse lengths. The pulse shape, the pulse length, and the length between the pulses may have any suitable form/value. The light intensity value of 400 cd, which is present during the pulses, is in accordance with the peak value of the predefined anti-collision mode light intensity distribution 80, shown in FIG. 6A.

Figure 7C:
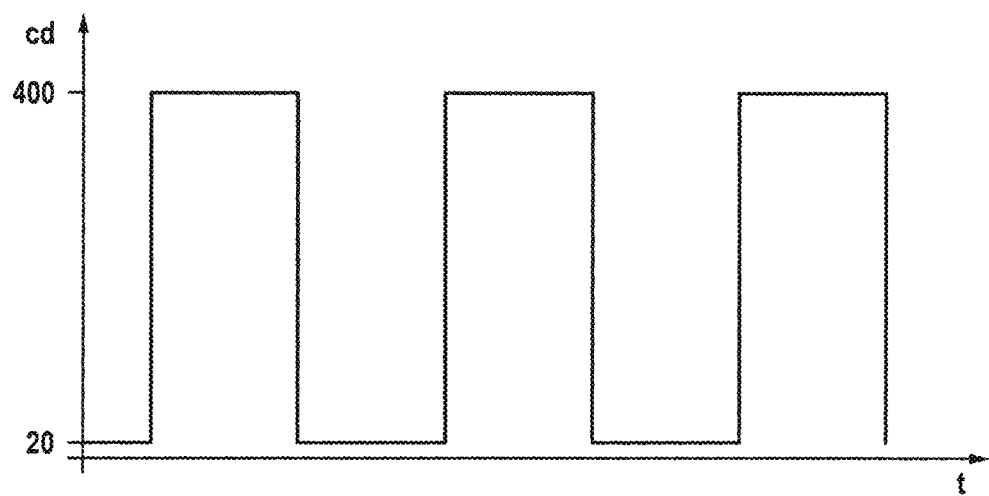
FIG. 7C shows exemplary courses of an output light intensity of the aircraft rearward signalling part of an exterior aircraft light in accordance with an exemplary embodiment of the invention over time in one mode of operation.

FIG. 7C shows a third light intensity course over time. The third light intensity course is a combination of the first light intensity course and the second light intensity course in such a way that the light intensity values along the third light intensity course correspond to the respectively higher value of the first light intensity course and the second light intensity course, shown in FIGS. 7A and 7B. In particular, the pulses of the third light intensity course correspond to the pulses of the second light intensity course. However, during the intervals between the pulses, the light intensity of the third light intensity course is at 20 cd. In this way, the light intensity between the pulses corresponds to the continuous light intensity of the first light intensity course. As a minimum light intensity of 20 cd is ensured at all times in the third light intensity course, the combined mode satisfies the FAR requirements for a navigation light. Further, with the light pulses having a light intensity of 400 cd, the combined mode also satisfies the FAR requirements for an anti-collision light.

The light intensity during the pulses of the second light intensity course and the third light intensity course, shown in FIGS. 7B and 7C, is subject to various considerations. On the one hand, the light intensity may be right in accordance with the desired light intensity distribution. This is shown in FIG. 7 with respect to the exemplary predefined anti-collision mode light intensity distribution of FIGS. 6A and 6B and the exemplary compound light intensity distribution of FIG. 6C. On the other hand, the light intensity value may be scaled to account for the different perceptions of light pulses of different lengths. The correction factor may be calculated with the Blondel Rey equation, known to the skilled person. An illustrative example is given as follows. Light pulses with a length of 200 ms are perceived with a lower light intensity. In particular, the Blondel Rey equation says that a pulse of 200 ms is perceived half as bright as its actual intensity value. Accordingly, in an exemplary embodiment, the light pulses of FIGS. 7B and 7C may have a length of 200 ms and may have a light intensity value of 800 cd.

Figure 8:
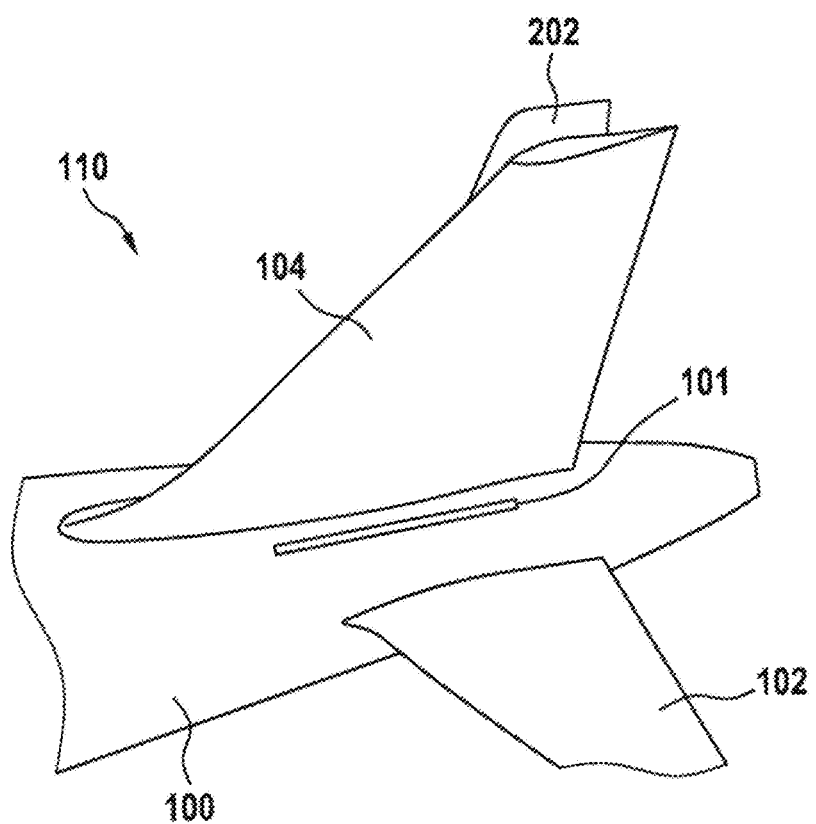
FIG. 8 shows a tail portion of an aircraft in accordance with an exemplary embodiment of the invention, equipped with an exterior aircraft light according to an exemplary embodiment of the invention, in a top perspective view.

FIG. 8 illustrates an aircraft 110, namely an airplane, in accordance with an exemplary embodiment of the invention in an upper perspective view, the aircraft 110 being equipped with an exterior aircraft light 101 in accordance with an exemplary embodiment of the invention. In the depicted arrangement, the exterior aircraft light 101 is mounted on the fuselage 100 between the vertical stabilizer 104 and the horizontal stabilizer 102. The aircraft 110 and the exterior aircraft light 101 may correspond to the aircraft 110 and the first exterior aircraft light 101 of FIG. 1, only shown in a perspective view. Accordingly, the aircraft 110 may also have the second, third, and fourth exterior aircraft lights 201, 301, 401 of FIG. 1, which are blocked from view due to the perspective of FIG. 8.

The longitudinal axis of the exterior aircraft light 101 may be parallel to the longitudinal axis of the fuselage 100, or the longitudinal axis of the exterior aircraft light 101 may be skewed relative to the longitudinal axis of the fuselage 100. The exterior aircraft light 101 is substantially arranged in a front-to-rear direction of the airplane 110.

Figure 9:
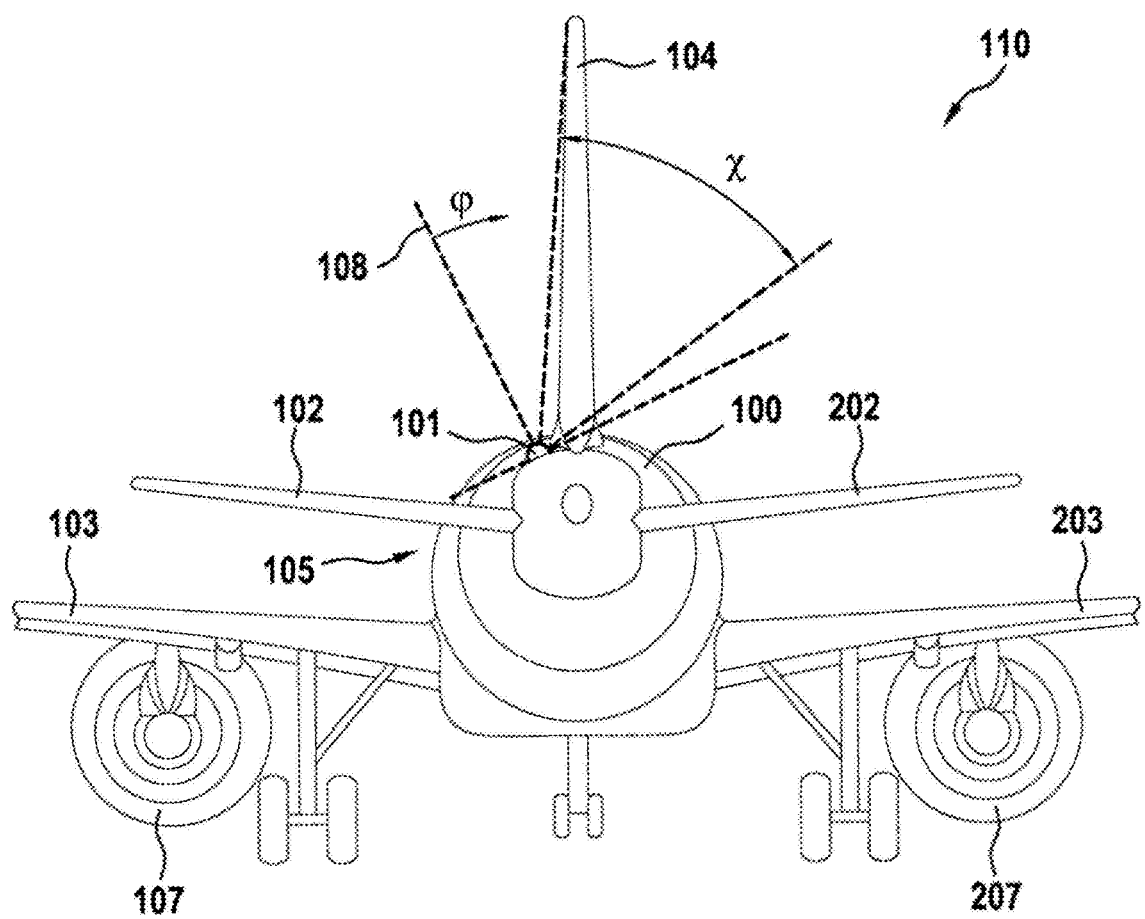
FIG. 9 shows the aircraft of FIG. 1 in the same rear view, illustrating the light output towards the vertical stabilizer for one of the exterior aircraft lights in accordance with exemplary embodiments of the invention.

FIG. 9 shows the aircraft 110 of FIG. 1 in the same rear view for illustrating the illumination of the left side of the vertical stabilizer 104 by the first exterior aircraft light 101. In order not to overcrowd FIG. 9, only said first exterior aircraft light 101 is shown. It is understood that the second, third, and fourth exterior aircraft lights 201, 301, 401 may also be present. The first exterior aircraft light 101 is mounted on the fuselage 100 between the vertical stabilizer 104 and the left horizontal stabilizer 102 near the tail of the fuselage 100 aft of the left wing 103.

FIG. 9 further shows a normal direction 108, off which the exterior aircraft light 101 irradiates the vertical stabilizer 104 at an angle $\varphi$, relative to the normal direction 108. In the exemplary embodiment of FIG. 9, the exterior aircraft light 101 provides illumination in an angular illumination range of from $\varphi=30°$ to $\varphi=80°$. This can also be expressed as the exterior aircraft light 101 having a stabilizer illumination opening angle $\chi$ of 50° towards the vertical stabilizer. The normal direction 108 and the angles $\varphi$ and $\chi$ are depicted in a viewing direction straight from the rear of the aircraft 110 in FIG. 9. It is also valid to define said parameters in a cross-sectional plane through the exterior aircraft light 101 orthogonal to the longitudinal extension thereof. It is further also valid to define said parameters with respect to a tangential plane to a top of the exterior aircraft light 101, in particular when the housing of the exterior aircraft light 101 has a rounded lens cover, as described below. The given angles φ and χ may apply to one or more or all cross-sections through the exterior aircraft light 101.

It is pointed out that above described angular illumination range of from φ=30° to φ=80° is exemplary only. It is apparent that this range may be adapted, depending on the size of the vertical stabilizer 104, the distance between the vertical stabilizer 104 and the exterior aircraft light 101, and the curvature of the fuselage in the tail portion thereof. In particular, the angular illumination range may become smaller, the larger the distance to the vertical stabilizer 104 is and the farther the exterior aircraft light 101 is positioned downwards on the arc towards the horizontal stabilizer 102. For example, the angular illumination range may be from φ=35° to φ=70° or from φ=45° to φ=60°. It is pointed out that the expression of the angular illumination range being from φ=30° to φ=80° does not mean that illumination is exclusively present in this angular range. It rather means that illumination is at least present in the given angular range. Stray light outside of said range is not excluded by the given terminology.

It is further apparent that above described angular illumination range and, thus, the stabilizer illumination opening angle, may have different values, depending on the stabilizer to be illuminated. In particular, exterior aircraft lights with different stabilizer illumination opening angles may be used for illuminating the sides of the vertical stabilizer and the undersides of the horizontal stabilizers.

Figure 10:
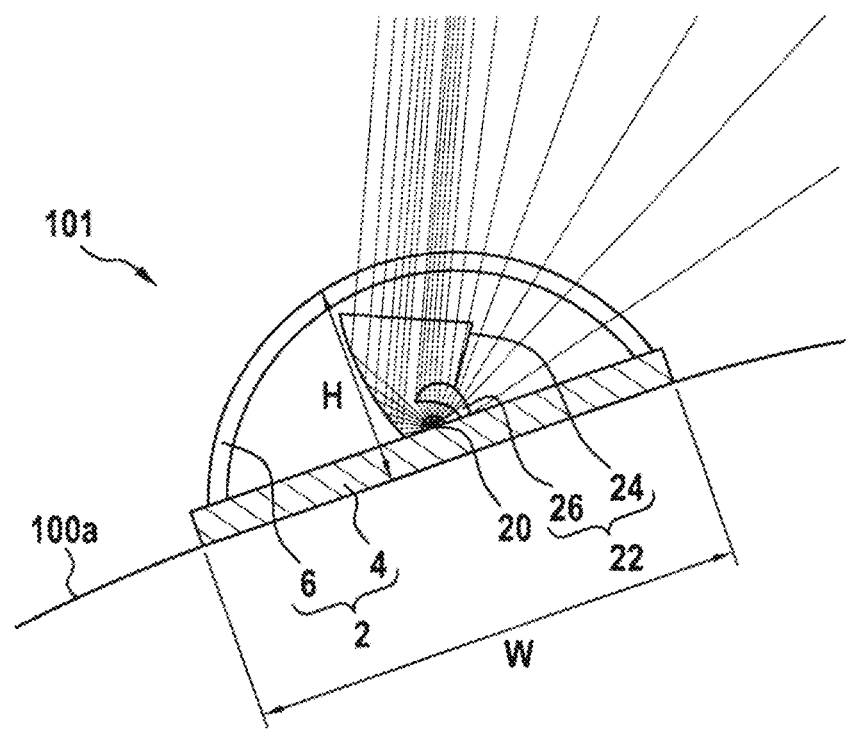
FIG. 10 shows a cross-sectional view through the stabilizer illumination part of an exterior aircraft light in accordance with an exemplary embodiment of the invention.

FIG. 10 shows an exterior aircraft light 101 in accordance with an exemplary embodiment of the invention in a cross-sectional view. The cross-sectional view is orthogonal to the longitudinal extension of the exterior aircraft light 101 and cuts through one of the second light sources 20. The exterior aircraft light 101 may be the first exterior aircraft light 101 of the previous Figures.

The exterior aircraft light 101 has a housing 2, which comprises a mounting structure 4 and a lens cover 6. In the depicted exemplary embodiment, the mounting structure 4 is a fuselage mounting plate, having substantially even upper and lower faces. The mounting plate has a width W in the depicted cross-section and in other cross-sections. The fuselage mounting plate 4 has substantially rectangular upper and lower faces. The lens cover 6 has a semi-tube-like shape. It is arranged on the mounting structure 4 and creates an inner space between the mounting structure 4 and the lens cover 6. The lens cover 6 is made from highly resistant transparent or translucent material. In particular, the lens cover 6 may be resistant to wide temperature variations, particle strikes, and hydraulic fluids, as described above. The mounting structure 4 and the lens cover 6 together have the height H.

The exterior aircraft light 101 has a plurality of second light sources 20, with one of them being arranged and shown in the cross-sectional plane of FIG. 10. The plurality of second light sources 20 are arranged in a linear manner on the mounting structure 4 along the longitudinal extension of the exterior aircraft light 101. The other second light sources are arranged in front of and behind the drawing plane of FIG. 9. In the exemplary embodiment of FIG. 9, the second light sources 20 are second LEDs.

Each of the second light sources 20 is provided with a second optical system 22 for directing the light of the respective second light source 20 towards the vertical stabilizer of the aircraft. In the exemplary embodiment of FIG. 9, the second optical system 22 has a collimating reflector 24 and a collimating lens 26. The collimating reflector 24 is shaped to collimate the light from the second light source 20 substantially towards the tip of the vertical stabilizer. As the tip of the vertical stabilizer is the region of the vertical stabilizer that is farthest removed from the exterior aircraft light 101, a high light intensity in the direction of the tip is desired. In the exemplary embodiment of FIG. 9, the collimating reflector 24 is parabolic and is shaped like a partial cup, in particular like a cup having a sector towards the vertical stabilizer cut out. For shaping the light not affected by the collimating reflector 24, the collimating lens 26 is provided. The collimating lens 26 is arranged to affect the light leaving the second light source 20 towards the top and towards the cut-out portion of the collimating reflector 24. The collimating lens 26 is a custom-shaped lens that distributes the captured light over the vertical stabilizer. The light leaving the collimating lens 26 has a smaller angular range in the depicted cross-sectional plane than the light hitting the collimating lens 26. Hence, the collimating lens 26 is referred to as collimating. It is pointed out, however, that any kind of second optical system may be employed that effectively distributes the light from the second light source 20 over the stabilizer to be illuminated, in particular over the full height of the vertical stabilizer/full width of the horizontal stabilizer in at least a vertical/horizontal corridor thereof. The shaping of the light intensity distribution for illuminating the stabilizer by the second optical system 22 is illustrated by a plurality of exemplary light rays.

The mounting structure 4 is attached to the outer skin 100a of the fuselage 100. It is also possible that the exterior aircraft light 101 is partially sunk into a corresponding recess in the fuselage 100. In the latter case, the lens cover may be shaped to be flush with the outer skin 100a of the fuselage 100 where the light from the second light sources 20 leaves the exterior aircraft light 101.

Figure 11:
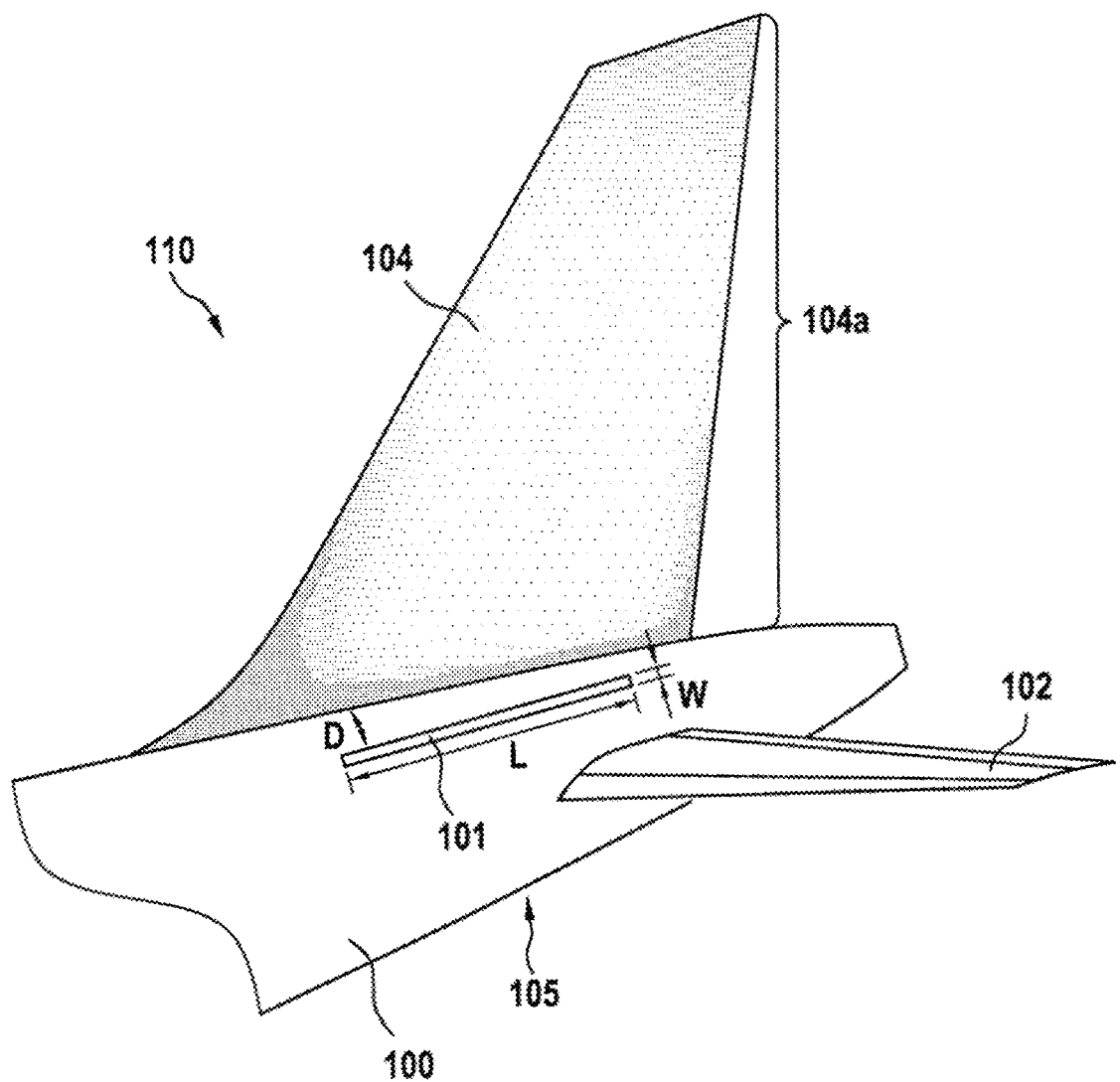
FIG. 11 shows an illumination pattern upon a vertical stabilizer, effected by an exterior aircraft light in accordance with an exemplary embodiment of the invention.

FIG. 11 shows an aircraft 110 in accordance with an exemplary embodiment of the invention, equipped with an exterior aircraft light 101 in accordance with an exemplary embodiment of the invention. In particular, FIG. 11 shows, in an upper perspective view, a tail portion 105 of the fuselage 100 and illustrates the width W and the length L of the exterior aircraft light 101, which has a displacement D along the circumferential arc from the vertical stabilizer 104. Again, for illustrative purposes, only one exterior aircraft light 101 is shown in a schematic view. It is understood that further exterior aircraft lights in accordance with exemplary embodiments of the invention, such as described herein, may be provided.

FIG. 11 shows the illumination distribution 104a on the vertical stabilizer 104, when illuminated by the exterior aircraft light 101. Unlike a conically outwardly fading illumination of customary aircraft vertical stabilizer illumination lights, the present illumination pattern 104a exhibits a high degree of uniformity of illumination of the vertical stabilizer 104. In particular, the vertical stabilizer may experience a highly uniform illumination of at least 100 1x. The illumination patterns created by the light from the second light sources of the exterior aircraft lights in accordance with exemplary embodiments of the invention may not be centered around a point, due to the plurality of second light sources 20, but provide a highly homogeneous illumination.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
   a housing having a length (L), a width (W), and a height (H), the length (L) being greater than the width (W) and the height (H) and the housing having a front end region and a rear end region with respect to its length, wherein the housing is configured to be mounted on a tail portion of a fuselage of an aircraft, with the length (L) of the housing being arranged along a stabilizer of the aircraft and generally along a longitudinal direction of the fuselage;
   at least one first light source, arranged in the rear end region of the housing, for providing at least one of aircraft rearward navigation lighting, aircraft rearward white strobe anti-collision lighting, and aircraft rearward red beacon lighting; and
   a plurality of second light sources, which are arranged spaced along the length (L) of the housing for a distributed illumination of said stabilizer of the aircraft.

2. The exterior aircraft light according to claim 1, wherein the at least one first light source is exactly one first light emitting diode (LED).

3. The exterior aircraft light according to claim 1, further comprising:
   at least one first optical system, associated with the at least one first light source, with the at least one first optical system transforming the light output from the at least one first light source into a signalling output light intensity distribution for aircraft rearward signal lighting.

4. The Exterior aircraft light according to claim 3, wherein the at least one first optical system comprises at least one lens.

5. The exterior aircraft light according to claim 3, wherein the signalling output light intensity distribution has a horizontal opening angle of at least 70°.

6. The exterior aircraft light according to claim 5, wherein the horizontal opening angle is 70° and 90°.

7. The exterior aircraft light according to claim 3, wherein the signalling output light intensity distribution has a vertical opening angle of at least 90°.

8. The exterior aircraft light according to claim 1, configured to operate the at least one first light source in at least two modes of operation, which comprise:
   a navigation mode of operation, wherein the at least one first light source continuously outputs light of a first light intensity, and
   an anti-collision mode of operation, wherein the at least one first light source outputs a sequence of light pulses, with the light pulses having a second light intensity.

9. The exterior aircraft light according to claim 8, wherein a ratio between the second light intensity and the first light intensity has a value of at least 15.

10. The exterior aircraft light according to claim 8, wherein the at least two modes of operation further comprise:
    a combined mode of operation, wherein the at least one first light source outputs a sequence of light pulses, with the light pulses having at least the second light intensity, and wherein the at least one first light source outputs light of at least the first light intensity between the light pulses.

11. The exterior aircraft light according to claim 1, having a stabilizer illumination opening angle of between 40° and 70° in at least one cross-section orthogonal to the length of the exterior aircraft light, for illuminating the stabilizer of the aircraft.

12. An aircraft including at least one exterior aircraft light in according to claim 1.

13. The aircraft according to claim 12, comprising:
    a fuselage having a tail portion;
    a vertical stabilizer;
    a left horizontal stabilizer; and
    a right horizontal stabilizer;
    wherein the at least one exterior aircraft light comprises:
        a first exterior aircraft light, mounted to the tail portion of the fuselage between the vertical stabilizer and the left horizontal stabilizer;
        a second exterior aircraft light, mounted to the tail portion of the fuselage between the vertical stabilizer and the right horizontal stabilizer;
        a third exterior aircraft light, mounted to the tail portion of the fuselage below the left horizontal stabilizer; and
        a fourth exterior aircraft light, mounted to the tail portion of the fuselage below the right horizontal stabilizer.

14. A method of operating an exterior aircraft light mounted to a tail portion of a fuselage of an aircraft along a stabilizer of the aircraft and generally along a longitudinal direction of the fuselage, comprising:
    providing at least one of aircraft rearward navigation lighting, aircraft rearward white strobe anti-collision lighting, and aircraft rearward red beacon lighting from a rear end region of the exterior aircraft light via at least one first light source, and
    providing distributed illumination of said stabilizer of the aircraft via a plurality of second light sources, which are arranged spaced along the exterior aircraft light.

* * * * *